United States Patent
Cao et al.

(10) Patent No.: US 11,985,518 B2
(45) Date of Patent: May 14, 2024

(54) PCI CONFLICT DETECTION AND OPTIMIZATION METHOD, APPARATUS, AND SYSTEM

(71) Applicant: HUAWEI TECHNOLOGIES CO., LTD., Guangdong (CN)

(72) Inventors: Longyu Cao, Shanghai (CN); Yaoguang Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 380 days.

(21) Appl. No.: 17/490,881

(22) Filed: Sep. 30, 2021

(65) Prior Publication Data
US 2022/0022060 A1 Jan. 20, 2022

Related U.S. Application Data

(63) Continuation of application No. PCT/CN2020/078073, filed on Mar. 5, 2020.

(30) Foreign Application Priority Data

Mar. 30, 2019 (CN) .......................... 201910254041.6

(51) Int. Cl.
*H04W 24/02* (2009.01)
*H04W 8/26* (2009.01)
(Continued)

(52) U.S. Cl.
CPC ............ *H04W 24/02* (2013.01); *H04W 8/26* (2013.01); *H04W 24/04* (2013.01); *H04L 41/04* (2013.01); *H04W 16/02* (2013.01); *H04W 84/18* (2013.01)

(58) Field of Classification Search
CPC ..... H04W 24/00; H04W 24/02; H04W 24/04; H04W 8/16; H04W 8/26; H04W 76/11;
(Continued)

(56) References Cited

U.S. PATENT DOCUMENTS

2010/0008235 A1 1/2010 Tinnakornsrisuphap et al.
2010/0178912 A1* 7/2010 Gunnarsson .......... H04W 24/02
455/445
(Continued)

FOREIGN PATENT DOCUMENTS

CN 101808372 A 8/2010
CN 102149149 * 8/2011 ............ H04W 36/00
(Continued)

OTHER PUBLICATIONS

Ericsson, "Cells information from gNB-CU to gNB-DU," 3GPP TSG RAN WG3 Meeting #98, R3-174784, Reno, Nevada, USA, Nov. 27-Dec. 1, 2017, 4 pages.
(Continued)

*Primary Examiner* — Warner Wong
(74) *Attorney, Agent, or Firm* — Fish & Richardson P.C.

(57) ABSTRACT

Embodiments of this application provide methods, apparatuses, and systems for physical cell identifier (PCI) conflict detection and optimization. One method includes: receiving a PCI conflict detection notification message for triggering the control network element to perform PCI conflict detection; determining that a PCI conflict exists in at least two cells; determining whether the at least two cells are managed by the control network element; in response to determining that the at least two cells are cells managed by the control network element, performing PCI optimization on PCI conflicted cells managed by the control network element, wherein the PCI conflicted cells comprise the at least two cells; and in response to determining that at least one of the at least two cells is not a cell managed by the control network element, sending a PCI optimization request message to a first management network element, wherein the PCI optimization request message requests the first management network element to perform PCI optimization.

20 Claims, 23 Drawing Sheets

(51) Int. Cl.
*H04W 24/04* (2009.01)
*H04L 41/04* (2022.01)
*H04W 16/02* (2009.01)
*H04W 84/18* (2009.01)

(58) Field of Classification Search
CPC ..... H04W 76/19; H04W 84/00; H04W 84/18; H04W 88/08; H04W 80/00; H04W 72/00; H04W 72/04; H04W 728/16; H04W 728/18; H04W 16/00; H04W 16/02
See application file for complete search history.

(56) References Cited

U.S. PATENT DOCUMENTS

| | | | | |
|---|---|---|---|---|
| 2010/0297955 | A1* | 11/2010 | Marinier | H04W 36/0061 455/73 |
| 2010/0311407 | A1* | 12/2010 | Yao | H04W 36/00835 455/422.1 |
| 2011/0038279 | A1* | 2/2011 | Cho | H04W 24/02 370/254 |
| 2011/0038326 | A1* | 2/2011 | Davies | H04W 8/26 370/329 |
| 2012/0275315 | A1* | 11/2012 | Schlangen | H04W 24/02 370/242 |
| 2013/0150056 | A1* | 6/2013 | Yi | H04W 36/0061 455/444 |
| 2014/0335874 | A1* | 11/2014 | Bakker | H04W 24/08 455/450 |
| 2015/0063137 | A1* | 3/2015 | Shen | H04W 24/10 370/252 |
| 2015/0149627 | A1* | 5/2015 | Zhao | H04W 36/0083 709/224 |
| 2015/0245221 | A1* | 8/2015 | Yiu | H04W 4/70 455/446 |
| 2016/0212632 | A1* | 7/2016 | Katamreddy | H04W 8/005 |
| 2017/0353913 | A1* | 12/2017 | Sun | H04W 48/16 |
| 2018/0063757 | A1* | 3/2018 | Gormley | H04W 88/08 |
| 2018/0206150 | A1* | 7/2018 | Pal | H04B 17/327 |
| 2018/0332513 | A1* | 11/2018 | Cao | H04W 36/14 |
| 2021/0337394 | A1* | 10/2021 | Jin | H04W 16/18 |
| 2021/0345210 | A1* | 11/2021 | Chen | H04W 36/08 |

FOREIGN PATENT DOCUMENTS

| | | | | |
|---|---|---|---|---|
| CN | 102149149 | A | | 8/2011 |
| CN | 102256284 | A | | 11/2011 |
| CN | 102348188 | A | | 2/2012 |
| CN | 103686785 | A | | 3/2014 |
| CN | 106162615 | | * 11/2016 | ............ H04W 8/26 |
| CN | 107852650 | A | | 3/2018 |
| CN | 107911826 | A | | 4/2018 |
| CN | 108271178 | A | | 7/2018 |
| IN | 106162615 | A | | 11/2016 |
| KR | 20110030678 | | * 3/2011 | ............ H04W 8/26 |
| WO | 2015038230 | A1 | | 3/2015 |

OTHER PUBLICATIONS

Extended European Search Report issued in European Application No. 20784294.9 dated Mar. 22, 2022, 13 pages.
Samsung, "Discussion for PCI Confusion," 3GPP TSG-RAN WG3#100, R3-183026, Busan, South Korea, May 21-25, 2018, 3 pages.
3GPP TR 38.889 V0.2.1 (Nov. 2018), "3rd Generation Partnership Project; Technical Specification Group Radio Access Network; Study on NR-based Access to Unlicensed Spectrum; (Release 16)," Nov. 2018, 111 pages.
Huawei, "PCI Selection for NR cells," 3GPP TSG-RAN3 Meeting #103, R3-190378, Athens, Greece, Feb. 25-Mar. 1, 2019, 3 pages.
Office Action issued in Chinese Application No. 201910254041.6 dated Apr. 30, 2021, 15 pages (with English translation).
PCT International Search Report and Written Opinion issued in International Application No. PCT/CN2020/078073 dated May 26, 2020, 15 pages (with English translation).

* cited by examiner

PCI CONFLICT DETECTION AND OPTIMIZATION METHOD, APPARATUS, AND SYSTEM

CROSS-REFERENCE TO RELATED APPLICATIONS

This application is a continuation of International Application No. PCT/CN2020/078073, filed on Mar. 5, 2020, which claims priority to Chinese Patent Application No. 201910254041.6, filed on Mar. 30, 2019. The disclosures of the aforementioned applications are hereby incorporated by reference in their entireties.

TECHNICAL FIELD

Embodiments of this application relate to the field of communication technologies, and in particular, to a PCI conflict detection and optimization method, an apparatus, and a system.

BACKGROUND

In the field of communication technologies, a physical cell identifier (PCI) is an important parameter of a cell in a long term evolution (LTE) network or a next generation (new radio, NR) network (which may also be referred to as a 5G NR network). The PCI affects downlink signal synchronization, demodulation, and cell handover. Therefore, assigning an appropriate PCI to a cell is of great significance to radio network construction and maintenance.

Usually, a quantity of PCIs is limited (where the LTE network includes 504 PCIs). When a quantity of cells in a network is large, PCI reuse inevitably occurs, resulting in a PCI conflict (where the PCI conflict includes PCI collision and PCI confusion). Alternatively, when a network layout changes (for example, a network capacity is expanded) or a network element parameter on the live network changes (for example, a neighbor relation changes), some cells reuse a same PCI, resulting in a PCI conflict. When the PCI conflict occurs, an appropriate PCI needs to be reassigned to a cell in the network. In the LTE network, in some trigger conditions (including manual triggering, automatic neighbor detection function triggering, or the like), a base station may perform PCI conflict detection to determine whether there are cells, in which a PCI conflict occurs, in cells served by the base station. If there are cells, in which the PCI conflict occurs, the base station sends a detection result to an element management system (EMS), so that the EMS performs PCI optimization on the cells in which the conflict occurs, that is, reassigns PCIs.

However, with development of a 5G NR network technology, in an architecture in which a control network element and a radio access network element are split in the 5G NR network, no effective PCI conflict detection and optimization method is yet proposed.

SUMMARY

Embodiments of this application provide a PCI conflict detection and optimization method, an apparatus, and a system to implement PCI conflict detection and optimization in a 5G NR network.

To achieve the foregoing objective, the following technical solutions are used in the embodiments of this application.

According to a first aspect, an embodiment of this application provides a PCI conflict detection and optimization method. The method includes: a first control network element receives a PCI conflict detection notification message, where the PCI conflict detection notification message is used to trigger the first control network element to perform PCI conflict detection; the first control network element detects that a PCI conflict exists in at least two cells; and if the at least two cells are cells managed by the first control network element, the first control network element performs PCI optimization on PCI conflicted cells managed by the first control network element, where the PCI conflicted cells include the at least two cells, in which the PCI conflict exists, that are detected by the first control network element; or if at least one of the at least two cells is not a cell managed by the first control network element, the first control network element sends a PCI optimization request message to a first management network element, where the PCI optimization request message is used to request the first management network element to perform PCI optimization.

In this embodiment of this application, when the first control network element detects that a PCI conflict exists in at least two cells, before performing PCI optimization, the first control network element first determines whether the at least two cells are cells managed by the first control network element. When the at least two cells in which the PCI conflict exists are cells managed by the first control network element, the first control network element may optimize PCI conflicted cells managed by the first control network element (where the PCI conflicted cells include the at least two cells). Otherwise, when at least one of the at least two cells in which the PCI conflict exists is not a cell managed by the first control network element, the first control network element has no permission to perform PCI optimization on PCI conflicted cells (where the PCI conflicted cells include the at least two cells), and in this case, the first control network element needs to request an upper-level network element (namely, the first management network element) of the first control network element to perform PCI optimization.

According to the PCI conflict detection and optimization method provided in this embodiment of this application, after the first control network element receives the PCI conflict detection notification message, the first control network element detects that a PCI conflict exists in at least two cells. If the at least two cells in which the PCI conflict exists are cells managed by the first control network element, the first control network element performs PCI optimization on the PCI conflicted cells managed by the first control network element. If at least one of the at least two cells in which the PCI conflict exists is not a cell managed by the first control network element, and the at least one cell is a cell managed by a second control network element, the first control network element sends the PCI optimization request message (that is, a first optimization request message in the following embodiment) to the first management network element. In this way, PCI conflict detection and optimization in a 5G NR network can be smoothly implemented.

In a possible implementation, the PCI conflict detection and optimization method provided in this embodiment of this application further includes: the first control network element receives PCI reservation information from the first management network element, where the PCI reservation information includes at least one assignable PCI.

In a possible implementation, that the first control network element performs PCI optimization on PCI conflicted cells managed by the first control network element may specifically include: the first control network element reassigns, based on the PCI reservation information, PCIs to the PCI conflicted cells managed by the first control network element.

In this embodiment of this application, that the first control network element reassigns the PCIs to the PCI conflicted cells based on the PCI reservation information means that the first control network element reassigns a PCI to at least one cell of the PCI conflicted cells, or may be understood as that the first control network element may reassign PCIs to some cells or all cells of the PCI conflicted cells. In this way, a PCI conflict problem is resolved.

It should be understood that the PCI conflicted cells may be the foregoing detected at least two cells in which the PCI conflict exists, that is, the PCI conflicted cells include only the at least two cells. The PCI conflicted cells may alternatively include another cell different from the foregoing detected at least two cells in which the PCI conflict exists, that is, the PCI conflicted cells include the at least two cells and the another cell.

It should be understood that, in this embodiment of this application, after the first control network element completes PCI optimization, the first control network element may also update an NRT and an NCL that are locally stored by the first control network element.

In a possible implementation, the PCI conflict detection notification message is a neighbor relation notification message received by the first control network element from a first radio access network element, the neighbor relation notification message includes a neighbor relation table (NRT) and a neighbor cell list (NCL) that are corresponding to the first radio access network element, and the first radio access network element is one of radio access network elements managed by the first control network element.

In a possible implementation, that the first control network element detects that a PCI conflict exists in at least two cells specifically includes: the first control network element determines, based on the NRT and the NCL that are corresponding to the first radio access network element and an NRT and an NCL that are corresponding to another radio access network element, that the PCI conflict exists in the at least two cells.

In this embodiment of this application, both the first radio access network element and the another radio access network element are radio access network elements managed by the first control network element, and the first control network element may determine, based on the NRT and the NCL that are corresponding to the first radio access network element and that are in the neighbor relation notification message, and the NRT and the NCL that are corresponding to the another radio access network element, that the PCI conflict exists in the at least two cells, and may determine that the PCI conflict exists in which cells. Specifically, the first control network element determines, based on the NCL of the first radio access network element and the NCL of the another radio access network element, that which cells have a same PCI, that is, which cells reuse the PCI. Then, the first control network element determines, based on the NRT corresponding to the first radio access network element and/or the NRT corresponding to the another radio access network element, whether cells having the same PCI are neighboring cells (first-order neighboring cells, second-order neighboring cells, or the like), so as to determine the at least two cells in which the PCI conflict exists.

It should be understood that, if the PCI conflict detection notification message is a neighbor relation notification message sent by the first radio access network element, the at least two cells, in which the PCI conflict exists, that are detected by the first control network element need to be cells managed by the first control network element. This is because the first radio access network element is a radio access network element managed by the first control network element, and the at least two cells are cells managed by the first radio access network element. Therefore, the at least two cells are cells managed by the first control network element.

In a possible implementation, the PCI conflict detection and optimization method provided in this embodiment of this application further includes: after the first control network element performs PCI optimization on the PCI conflicted cells managed by the first control network element, the first control network element sends a PCI update notification message to a second control network element, where the PCI update notification message includes an NRT corresponding to the first control network element, PCIs of the PCI conflicted cells managed by the first control network element, evolved universal terrestrial radio access network (E-UTRAN) cell global identifiers (CGI) (ECGI for short) of the PCI conflicted cells, and a vendor name of the first control network element, and the first control network element is adjacent to the second control network element.

In this embodiment of this application, after the first control network element performs PCI optimization on the PCI conflicted cells managed by the first control network element, an optimization result of the first control network element may cause a PCI conflict between a cell managed by the first management network element and a cell managed by the second control network element adjacent to the first control network element. Therefore, after the first control network element completes PCI optimization, the first control network element sends the PCI update notification message to the second control network element, to trigger the second control network element to start PCI conflict detection.

In a possible implementation, the PCI conflict detection notification message is a PCI update notification message received by the first control network element from a second control network element, the PCI update notification message includes an NRT corresponding to the second control network element, a PCI of a first cell, an ECGI of the first cell, and a vendor name of the second control network element, the first cell is a cell on which PCI optimization is performed by the second control network element, and the at least two cells include at least one cell managed by the first control network element and at least one cell of the first cell.

In a possible implementation, the PCI update notification message may alternatively be a PCI update notification message including the following information: the NRT corresponding to the second control network element, the NCL corresponding to the first control network element, and the vendor name of the second control network element.

In this embodiment of this application, the first control network element is adjacent to the second control network element, and after the second control network element performs PCI optimization on a cell managed by the second control network element, an optimization result of the second control network element may cause a PCI conflict between a cell managed by the first control network element and a cell (namely, the first cell) on which optimization has been performed by the second control network element. Therefore, the second control network element may send a PCI optimization notification message to the first control network element, to trigger the first control network element to perform PCI conflict detection.

In a possible implementation, the first control network element determines, based on the NRT and the NCL that are locally stored by the first control network element, and the NRT corresponding to the second control network element, the PCI of the first cell, and the ECGI of the first cell that are in the PCI update notification message, that a PCI conflict exists in at least two cells (where the at least two cells include at least one of cells managed by the first control network element and at least one cell of the first cell), and may determine that the PCI conflict exists in which cells. Specifically, the first control network element determines, based on the PCI of the first cell, the ECGI of the first cell, and the NCL corresponding to the first control network element, that which cells of the first cell have same PCIs as which cells of the cells managed by the first control network element, and further determines, based on the NRT corresponding to the second control network element and/or the NRT corresponding to the first control network element, whether cells having the same PCI are neighboring cells (first-order neighboring cells, second-order neighboring cells, or the like), so as to determine the at least two cells in which the PCI conflict exists.

When the PCI update notification includes the NRT corresponding to the second control network element, the NCL corresponding to the first control network element, and the vendor name of the second control network element, the first control network element determines, based on the NRT and the NCL that are corresponding to the first control network element and the NRT and an NCL that are corresponding to the second control network element, that the PCI conflict exists in the at least two cells.

If the PCI conflict detection notification message is a PCI update notification message sent by the second control network element, whether at least one cell of the first cell is a cell managed by the first control network element is determined based on an ECGI of the at least one cell of the first cell (where the at least one cell of the first cell is a cell in which a PCI conflict occurs with the at least one of cells managed by the first control network element). If the at least one cell of the first cell is a cell managed by the first control network element, the first control network element may determine that the at least two cells in which the PCI conflict occurs are cells managed by the first control network element.

In a possible implementation, the PCI optimization request message includes PCIs of the at least two cells, in which the PCI conflict exists, that are detected by the first control network element, ECGIs of the at least two cells, and the vendor name of the second control network element.

In a possible implementation, the PCI conflict detection and optimization method provided in this embodiment of this application further includes: after the first control network element performs PCI optimization on the PCI conflicted cells managed by the first control network element, the first control network element sends, to a radio access network element corresponding to each PCI conflicted cell, a corresponding PCI of the PCI conflicted cell and a corresponding ECGI of the PCI conflicted cell; and the first control network element sends, to the first management network element, the PCIs of the PCI conflicted cells managed by the first control network element and the ECGIs of the PCI conflicted cells.

In this embodiment of this application, that the first control network element sends, to the first radio access network element, the PCIs of the PCI conflicted cells managed by the first control network element and the ECGIs of the PCI conflicted cells managed by the first control network element is used by the first radio access network element to update the NRT and the NCL that are locally stored by the first radio access network element.

According to a second aspect, an embodiment of this application provides a PCI conflict detection and optimization method. The method includes: when a physical cell identifier PCI conflict exists between a cell managed by a first control network element and a cell managed by a second control network element, a first management network element receives a first PCI optimization request message from the first control network element, where the first PCI optimization request message includes PCIs of at least two cells, in which a PCI conflict exists, that are detected by the first control network element, ECGIs of the at least two cells, and a vendor name of the second control network element, the at least two cells include at least one of cells managed by the first control network element and at least one cell of a first cell, and the first cell is a cell on which PCI optimization is performed by the second control network element; and when a vendor name of the first control network element is the same as the vendor name of the second control network element, the first management network element performs PCI optimization on PCI conflicted cells managed by the first management network element, where the PCI conflicted cells include the at least two cells, in which the PCI conflict exists, that are detected by the first control network element; or when a vendor name of the first control network element is different from the vendor name of the second control network element, the first management network element sends a second PCI optimization request message to a second management network element, where the second PCI optimization request message is used to request the second management network element to perform PCI optimization.

In a possible implementation, the PCI conflict detection and optimization method provided in this embodiment of this application further includes: the first management network element receives PCI reservation information from the second management network element, where the PCI reservation information includes at least one assignable PCI.

In a possible implementation, that the first management network element performs PCI optimization on PCI conflicted cells managed by the first management network element may specifically include: the first management network element reassigns, based on the PCI reservation information, PCIs to the PCI conflicted cells managed by the first management network element.

It should be understood that, after the first management network element completes PCI optimization, the first management network element may also update an NRT and an NCL that are locally stored by the first management network element.

In a possible implementation, the PCI conflict detection and optimization method provided in this embodiment of this application further includes: after the first management network element performs PCI optimization on the PCI conflicted cells managed by the first management network element, the first management network element sends, to the second management network element, PCIs of the PCI conflicted cells managed by the first management network element and ECGIs of the PCI conflicted cells; the first management network element receives updated PCI reservation information from the second management network element; and the first management network element sends, to a control network element managed by the first management network element, the updated PCI reservation information corresponding to each control network element.

On one hand, that the first management network element sends, to the second management network element, the PCIs of the PCI conflicted cells managed by the first management network element and the ECGIs of the PCI conflicted cells managed by the first management network element is used by the second management network element to update an NRT and an NCL that are locally stored by the second management network element. On the other hand, the second management network element may further update the PCI reservation information based on the PCIs that are of the PCI conflicted cells managed by the first management network element and that are sent by the first management network element.

In this embodiment of this application, because the first management network element has performed PCI optimization on the PCI conflicted cells based on the PCI reservation information corresponding to the first management network element, that is, some PCIs in the PCI reservation information corresponding to the first management network element have been assigned to cells in which the PCI conflict occurs, some PCIs in the PCI reservation information are invalid. The second management network element updates the PCI reservation information locally stored by the second management network element, so as to ensure availability of the PCI reservation information, thereby facilitating smooth execution of possible subsequent PCI optimization.

In a possible implementation, the PCI conflict detection and optimization method provided in this embodiment of this application further includes: after the first management network element performs PCI optimization on the PCI conflicted cells managed by the first management network element, the first management network element determines a radio access network element corresponding to each PCI conflicted cell managed by the first management network element; and the first management network element sends, to the radio access network element corresponding to each PCI conflicted cell, a corresponding PCI of the PCI conflicted cell and a corresponding ECGI of the PCI conflicted cell.

In a possible implementation, the second PCI optimization request message includes PCIs of the at least two cells, in which the PCI conflict exists, that are detected by the first control network element, ECGIs of the at least two cells, and the vendor name of the second control network element.

Optionally, in another implementation, the PCI optimization request message may include a PCI of a first cell, an ECGI of the first cell, and the vendor name of the second control network element, so that the first management network element determines, with reference to the NRT and the NCL that are corresponding to the first control network element and that are locally stored by the first management network element, and the PCI of the first cell and the ECGI of the first cell that are carried in the PCI optimization request message, that the PCI conflict exists in which cells of the cells managed by the first control network element and the second control network element.

According to a third aspect, an embodiment of this application provides a PCI conflict detection and optimization method. The method includes: when a PCI conflict exists between a cell managed by a first control network element and a cell managed by a second control network element, and a vendor name of the first control network element is different from a vendor name of the second control network element, a second management network element receives a PCI optimization request message from a first management network element, where the PCI optimization request message includes PCIs of at least two cells, in which a PCI conflict exists, that are detected by the first control network element, ECGIs of the at least two cells, and the vendor name of the second control network element, the at least two cells include at least one of cells managed by the first control network element and at least one cell of a first cell, and the first cell is a cell on which PCI optimization is performed by the second control network element; and the second management network element performs PCI optimization on PCI conflicted cells managed by the second management network element.

In a possible implementation, that the second management network element performs PCI optimization on PCI conflicted cells managed by the second management network element may specifically include: the second management network element reassigns, based on PCI reservation information stored in the second management network element, PCIs to the PCI conflicted cells managed by the second management network element, where the PCI reservation information includes at least one assignable PCI.

It should be understood that, after the second management network element completes PCI optimization, the second management network element may also update an NRT and an NCL that are locally stored by the second management network element.

In a possible implementation, the PCI conflict detection and optimization method provided in this embodiment of this application further includes: after the second management network element performs PCI optimization on the PCI conflicted cells managed by the second management network element, the second management network element sends, to the first management network element, PCIs of the PCI conflicted cells managed by the second management network element and ECGIs of the PCI conflicted cells.

Optionally, the second management network element may separately send, to the first management network element by using independent messages, updated PCI reservation information, the PCIs of the PCI conflicted cells managed by the second management network element, and the ECGIs of the PCI conflicted cells. For example, the second management network element sends the updated PCI reservation information by using a first message, sends, by using a second message, the PCIs of the PCI conflicted cells managed by the second management network element and the ECGIs of the PCI conflicted cells. Alternatively, the second management network element may carry the updated PCI reservation information, the PCIs of the PCI conflicted cells managed by the second management network element, and the ECGIs of the PCI conflicted cells in a same message, and send the message to the first management network element. This is not specifically limited in this embodiment of this application.

In a possible implementation, the PCI conflict detection and optimization method provided in this embodiment of this application further includes: after the second management network element performs PCI optimization on the PCI conflicted cells managed by the second management network element, the second management network element updates the PCI reservation information stored in the second management network element; and the second management network element sends, to the first management network element, PCI reservation information that is corresponding to the first management network element and that is in updated PCI reservation information.

For descriptions of related content and technical effects of the second aspect, the possible implementations of the second aspect, the third aspect, and the possible implementations of the third aspect, refer to descriptions of content and technical effects of the first aspect and the possible implementations of the first aspect. Details are not described herein again.

According to a fourth aspect, an embodiment of this application provides a control network element. The control network element is a first control network element, and the first control network element includes a receiving module, a detection module, a processing module, and a sending module. The receiving module is configured to receive a PCI conflict detection notification message, where the PCI conflict detection notification message is used to trigger the first control network element to perform PCI conflict detection; the detection module is configured to detect that a PCI conflict exists in at least two cells; and the processing module is configured to: when the at least two cells are cells managed by the first control network element, perform PCI optimization on PCI conflicted cells managed by the first control network element, where the PCI conflicted cells include the at least two cells, in which the PCI conflict exists, that are detected by the first control network element; or the sending module is configured to: when at least one of the at least two cells is not a cell managed by the first control network element, send a PCI optimization request message to a first management network element, where the PCI optimization request message is used to request the first management network element to perform PCI optimization.

In a possible implementation, the receiving module is further configured to receive PCI reservation information from the first management network element, where the PCI reservation information includes at least one assignable PCI; and the processing module is specifically configured to reassign, by the first control network element based on the PCI reservation information, PCIs to the PCI conflicted cells managed by the first control network element.

In a possible implementation, the PCI conflict detection notification message is a neighbor relation notification message received by the first control network element from a first radio access network element, the neighbor relation notification message includes an NRT and an NCL that are corresponding to the first radio access network element, and the first radio access network element is one of radio access network elements managed by the first control network element; and the detection module is specifically configured to determine, based on the NRT and the NCL that are corresponding to the first radio access network element and an NRT and an NCL that are corresponding to another radio access network element, that the PCI conflict exists in the at least two cells.

In a possible implementation, the sending module is further configured to send a PCI update notification message to a second control network element, where the PCI update notification message includes an NRT corresponding to the first control network element, PCIs of the PCI conflicted cells managed by the first control network element, ECGIs of the PCI conflicted cells, and a vendor name of the first control network element, and the first control network element is adjacent to the second control network element.

In a possible implementation, the PCI conflict detection notification message is a PCI update notification message received by the first control network element from a second control network element, the PCI update notification message includes an NRT corresponding to the second control network element, a PCI of a first cell, an ECGI of the first cell, and a vendor name of the second control network element, the first cell is a cell on which PCI optimization is performed by the second control network element, and the at least two cells include at least one cell managed by the first control network element and at least one cell of the first cell.

In a possible implementation, the PCI optimization request message includes PCIs of the at least two cells, in which the PCI conflict exists, that are detected by the first control network element, ECGIs of the at least two cells, and the vendor name of the second control network element.

In a possible implementation, the sending module is further configured to: send, to a radio access network element corresponding to each PCI conflicted cell, a corresponding PCI of the PCI conflicted cell and a corresponding ECGI of the PCI conflicted cell; and send, to the first management network element, the PCIs of the PCI conflicted cells managed by the first control network element and the ECGIs of the PCI conflicted cells.

According to a fifth aspect, an embodiment of this application provides a management network element. The management network element is a first management network element, and the first management network element includes a receiving module, a processing module, and a sending module. The receiving module is configured to: when a PCI conflict exists between a cell managed by a first control network element and a cell managed by a second control network element, receive a first PCI optimization request message from the first control network element, where the first PCI optimization request message includes PCIs of at least two cells, in which a PCI conflict exists, that are detected by the first control network element, ECGIs of the at least two cells, and a vendor name of the second control network element, the at least two cells include at least one of cells managed by the first control network element and at least one cell of a first cell, and the first cell is a cell on which PCI optimization is performed by the second control network element; and the processing module is configured to: when a vendor name of the first control network element is the same as the vendor name of the second control network element, perform PCI optimization on PCI conflicted cells managed by the first management network element, where the PCI conflicted cells include the at least two cells; or the sending module is configured to: when a vendor name of the first control network element is different from the vendor name of the second control network element, send a second PCI optimization request message to a second management network element, where the second PCI optimization request message is used to request the second management network element to perform PCI optimization.

In a possible implementation, the receiving module is further configured to receive PCI reservation information from the second management network element, where the PCI reservation information includes at least one assignable PCI; and the processing module is specifically configured to reassign, based on the PCI reservation information, PCIs to the PCI conflicted cells managed by the first management network element.

In a possible implementation, the sending module is further configured to send, to the second management network element, PCIs of the PCI conflicted cells managed by the first management network element and ECGIs of the PCI conflicted cells; the receiving module is further configured to receive updated PCI reservation information from the second management network element; and the sending module is further configured to send, to a control network element managed by the first management network element, the updated PCI reservation information corresponding to each control network element.

In a possible implementation, the first management network element provided in this embodiment of this application further includes a determining module. The determining module is configured to determine a radio access network element corresponding to each PCI conflicted cell; and the sending module is further configured to send, to the radio access network element corresponding to each PCI conflicted cell, a corresponding PCI of the PCI conflicted cell and a corresponding ECGI of the PCI conflicted cell.

In a possible implementation, the second PCI optimization request message includes PCIs of the at least two cells, in which the PCI conflict exists, that are detected by the first control network element, ECGIs of the at least two cells, and the vendor name of the second control network element.

According to a sixth aspect, an embodiment of this application provides a management network element. The management network element is a second management network element, and the second management network element includes a receiving module and a processing module. The receiving module is configured to: when a PCI conflict exists between a cell managed by a first control network element and a cell managed by a second control network element, and a vendor name of the first control network element is different from a vendor name of the second control network element, receive a PCI optimization request message from a first management network element, where the PCI optimization request message includes PCIs of at least two cells, in which a PCI conflict exists, that are detected by the first control network element, ECGIs of the at least two cells, and the vendor name of the second control network element, the at least two cells include at least one of cells managed by the first control network element and at least one cell of a first cell, and the first cell is a cell on which PCI optimization is performed by the second control network element; and the processing module is configured to perform PCI optimization on PCI conflicted cells managed by the second management network element.

In a possible implementation, the processing module is specifically configured to reassign, based on PCI reservation information stored in the second management network element, PCIs to the PCI conflicted cells managed by the second management network element, where the PCI reservation information includes at least one assignable PCI.

In a possible implementation, the second management network element provided in this embodiment of this application further includes a sending module. The sending module is configured to send, to the first management network element, PCIs of the PCI conflicted cells managed by the second management network element and ECGIs of the PCI conflicted cells.

In a possible implementation, the second management network element provided in this embodiment of this application further includes an updating module. The updating module is configured to update the PCI reservation information stored in the second management network element, and the sending module is further configured to send, to the first management network element, PCI reservation information that is corresponding to the first management network element and that is in updated PCI reservation information.

According to a seventh aspect, an embodiment of this application provides a control network element. The control network element is a first control network element, and the first control network element includes a processor and a memory coupled to the processor. The memory is configured to store computer instructions. When the first control network element is run, the processor executes the computer instructions stored in the memory, to enable the first control network element to perform the method according to any one of the first aspect and the possible implementations of the first aspect.

According to an eighth aspect, an embodiment of this application provides a control network element. The control network element is a first control network element, the first control network element exists between a product form of a chip, and a structure of the first control network element includes a processor and a memory. The memory is configured to be coupled to the processor, and the memory is configured to store computer instructions. The processor is configured to execute the computer instructions stored in the memory, to enable the first control network element to perform the method according to any one of the first aspect and the possible implementations of the first aspect.

According to a ninth aspect, an embodiment of this application provides a computer-readable storage medium. The computer-readable storage medium may include computer instructions. When the computer instructions are run on a computer, a first control network element is enabled to perform the method according to any one of the first aspect and the possible implementations of the first aspect.

According to a tenth aspect, an embodiment of this application provides a computer program product including computer instructions. When the computer program product runs on a computer, a first control network element is enabled to perform the method according to any one of the first aspect and the possible implementations of the first aspect.

According to an eleventh aspect, an embodiment of this application provides a management network element. The management network element is a first management network element, and the first management network element includes a processor and a memory coupled to the processor. The memory is configured to store computer instructions. When the first management network element is run, the processor executes the computer instructions stored in the memory, to enable the first management network element to perform the method according to any one of the second aspect and the possible implementations of the second aspect.

According to a twelfth aspect, an embodiment of this application provides a management network element. The management network element is a first management network element, the first management network element exists between a product form of a chip, and a structure of the first management network element includes a processor and a memory. The memory is configured to be coupled to the processor, and the memory is configured to store computer instructions. The processor is configured to execute the computer instructions stored in the memory, to enable the first management network element to perform the method according to any one of the second aspect and the possible implementations of the second aspect.

According to a thirteenth aspect, an embodiment of this application provides a computer-readable storage medium. The computer-readable storage medium may include computer instructions. When the computer instructions are run on a computer, a first management network element is enabled to perform the method according to any one of the second aspect and the possible implementations of the second aspect.

According to a fourteenth aspect, an embodiment of this application provides a computer program product including computer instructions. When the computer program product runs on a computer, a first management network element is enabled to perform the method according to any one of the second aspect and the possible implementations of the second aspect.

According to a fifteenth aspect, an embodiment of this application provides a management network element. The management network element is a second management network element, and the second management network element includes a processor and a memory coupled to the processor. The memory is configured to store computer instructions. When the second management network element is run, the processor executes the computer instructions stored in the memory, to enable the second management network element to perform the method according to any one of the third aspect and the possible implementations of the third aspect.

According to a sixteenth aspect, an embodiment of this application provides a management network element. The management network element is a second management network element, the second management network element exists between a product form of a chip, and a structure of the second management network element includes a processor and a memory. The memory is configured to be coupled to the processor, and the memory is configured to store computer instructions. The processor is configured to execute the computer instructions stored in the memory, to enable the second management network element to perform the method according to any one of the third aspect and the possible implementations of the third aspect.

According to a seventeenth aspect, an embodiment of this application provides a computer-readable storage medium. The computer-readable storage medium may include computer instructions. When the computer instructions are run on a computer, a second management network element is enabled to perform the method according to any one of the third aspect and the possible implementations of the third aspect.

According to an eighteenth aspect, an embodiment of this application provides a computer program product including computer instructions. When the computer program product runs on a computer, a second management network element is enabled to perform the method according to any one of the third aspect and the possible implementations of the third aspect.

According to a nineteenth aspect, an embodiment of this application provides a communication system. The communication system includes the first control network element and the second control network element according to the fourth aspect, the first management network element according to the fifth aspect, and the second management network element according to the sixth aspect; or the communication system includes the first control network element and the second control network element according to the seventh aspect or the eighth aspect, the first management network element according to the eleventh aspect or the twelfth aspect, and the second management network element according to the fifteenth aspect and the sixteenth aspect.

Specifically, the first control network element is configured to: receive a PCI conflict detection notification message, where the PCI conflict detection notification message is used to trigger the first control network element to perform PCI conflict detection; detect that a PCI conflict exists in at least two cells; and when the at least two cells are cells managed by the first control network element, perform PCI optimization on PCI conflicted cells managed by the first control network element, where the PCI conflicted cells include the at least two cells; or when at least one of the at least two cells is not a cell managed by the first control network element, send a first PCI optimization request message to the first management network element, where the first PCI optimization request message is used to request the first management network element to perform PCI optimization.

The first management network element is configured to: when a PCI conflict exists between a cell managed by the first control network element and a cell managed by the second control network element, receive the first PCI optimization request message from the first control network element, where the first PCI optimization request message includes PCIs of the at least two cells, in which the PCI conflict exists, that are detected by the first control network element, ECGIs of the at least two cells, and a vendor name of the second control network element, the at least two cells include at least one of cells managed by the first control network element and at least one cell of a first cell, and the first cell is a cell on which PCI optimization is performed by the second control network element; and when a vendor name of the first control network element is the same as the vendor name of the second control network element, perform PCI optimization on PCI conflicted cells managed by the first management network element, where the PCI conflicted cells include the at least two cells; or when a vendor name of the first control network element is different from the vendor name of the second control network element, send a second PCI optimization request message to the second management network element, where the second PCI optimization request message is used to request the second management network element to perform PCI optimization.

The second management network element is configured to: when the PCI conflict exists between the cell managed by the first control network element and the cell managed by the second control network element, and the vendor name of the first control network element is different from the vendor name of the second control network element, receive the second PCI optimization request message from the first management network element, and perform PCI optimization on PCI conflicted cells managed by the second management network element, where the second PCI optimization request message includes the PCIs of the at least two cells, in which the PCI conflict exists, that are detected by the first control network element, the ECGIs of the at least two cells, and the vendor name of the second control network element, the at least two cells include at least one of cells managed by the first control network element and at least one cell of the first cell, and the first cell is a cell on which PCI optimization is performed by the second control network element.

It should be understood that, for beneficial effects achieved by the technical solutions of the fourth aspect to the nineteenth aspect and corresponding possible implementations in the embodiments of this application, refer to technical effects of the foregoing first aspect and the possible implementations corresponding to the first aspect, the second aspect and the possible implementations corresponding to the second aspect, or the third aspect and the possible implementations corresponding to the third aspect. This is not described herein again.

DESCRIPTION OF EMBODIMENTS

The term "and/or" in this specification describes only an association relation for describing associated objects and represents that three relations may exist. For example, A and/or B may represent the following three cases: only A exists, both A and B exist, and only B exists.

In the specification and claims in embodiments of this application, the terms "first", "second", and the like are intended to distinguish between different objects but do not indicate a particular order of the objects. For example, a first control network element, a second control network element, and the like are used to distinguish between different control network elements but do not indicate a specific sequence of the control network elements, and a first management network element, a second management network element, and the like are used to distinguish between different management network elements but do not indicate a specific sequence of the management network elements.

In the embodiments of this application, the word such as "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word such as "example" or "for example" is intended to present a related concept in a specific manner.

In the description of the embodiments of this application, unless otherwise stated, "a plurality of" means two or more than two. For example, a plurality of processing units are two or more processing units. A plurality of systems are two or more systems.

First, some concepts related to a PCI conflict detection and optimization method, an apparatus, and a system provided in the embodiments of this application are explained and described.

A PCI conflict means a PCI conflict caused by PCI reuse (that is, a same PCI is assigned). The PCI conflict usually includes PCI collision and PCI confusion. The PCI collision means that when the PCI collision occurs between neighboring intra-frequency cells having a same PCI, a terminal device cannot normally perform signal synchronization and demodulation in an overlapping area of the two neighboring cells. The PCI confusion means that when the PCI confusion occurs in two intra-frequency cells that are neighbors of another cell and that have the same PCI, the terminal device fails to be handed over to a cell, and consequently a service of the terminal device is interrupted.

Figure 1A:
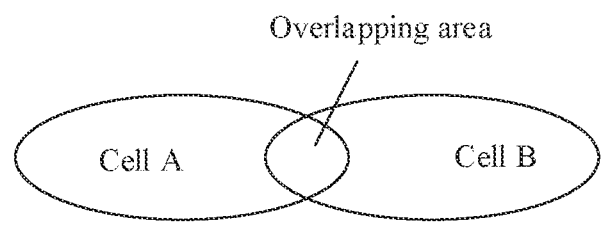
FIG. 1(a) and FIG. 1(b) are a schematic diagram of a PCI collision scenario and a PCI confusion scenario according to an embodiment of this application.
Figure 1B:

A PCI collision scenario and a PCI confusion scenario are separately shown in FIG. 1(a) and FIG. 1(b). FIG. 1(a) is the PCI collision scenario, where a cell A and a cell B are neighboring intra-frequency cells, and PCIs of the cell A and the cell B are the same. When the terminal device is located in an overlapping area of the cell A and the cell B, because PCI collision occurs in the overlapping area, the terminal device cannot determine a cell from which a signal is to be received, and cannot determine a cell to which a signal is to be sent. Consequently, the terminal device cannot normally perform signal synchronization and demodulation. FIG. 1(b) is the PCI confusion scenario, where two neighboring cells of a cell A or a cell B and a cell C, the cell B and the cell C are intra-frequency cells, and PCIs of the cell B and the cell C are the same. For example, both PCIs of the cell B and the cell C are X. When the terminal device performs cell handover, the terminal device intends to be handed over to a cell whose PCI is X. Because both the PCIs of the cell B and the cell C are X, the terminal device cannot determine which cell of the cell B and the cell C is a target cell to which the terminal device intends to be handed over. Consequently, the service of the terminal device is interrupted.

A neighbor relation table (NRT) is used to store neighboring cells of a cell. The NRT includes neighboring cells of each of a plurality of cells and ECGIs of the neighboring cells corresponding to each of the plurality of cells. It should be understood that the neighboring cells of the cell may include a first-order neighboring cell, a second-order neighboring cell, and the like. Referring to FIG. 1(a) and FIG. 1(b), for the cell A, in FIG. 1(a), the cell B is referred to as a first-order neighboring cell, and in FIG. 1(b), both the cell B and the cell C are referred to as second-order neighboring cells. One cell is used as an example. The cell is referred to as a cell 1. The NRT stores neighboring cells, that is, a first-order neighboring cell, a second-order neighboring cell, and the like, of the cell 1, and stores ECGIs of the neighboring cells.

A neighbor cell list (NCL) is similar to the foregoing NRT. The NCL is also used to store neighboring cells of a cell. The NCL stores PCIs and ECGIs of the neighboring cells, and the PCIs of the neighboring cells are respectively corresponding to the ECGIs of the neighboring cells.

It should be noted that network elements in the embodiments of this application include a centralized unit (CU), a distributed unit (DU), an EMS, and an open networking automation platform (ONAP). It may be understood that, these network elements locally store NRTs and NCLs of cells managed by the network elements, and each network element may update, based on a network structure change or a configuration change, the NRT and the NCL that are locally stored by the network element.

PCI conflict detection is a process of detecting whether the PCI conflict exists between a current cell and a neighboring cell of the current cell. In the embodiments of this application, a network element that performs PCI conflict detection may be the CU. Usually, a trigger condition for starting PCI conflict detection may include manual triggering, automatic neighbor relation detection function triggering, X2 interface message triggering, or the like. Manually triggering PCI conflict detection means that an operation and maintenance manager of an operator manually modifies a configuration parameter of a cell, to trigger PCI conflict detection, for example, adds or deletes some cells. Automatic neighbor relation detection function triggering means that a network element (for example, the DU) having an automatic neighbor relation detection function obtains neighboring cell information (for example, including an NRT and an NCL) reported by UE, to trigger PCI conflict detection. X2 interface message triggering means that neighboring base stations send PCI configuration information of the neighboring base stations over an X2 interface, to trigger PCI conflict detection.

PCI optimization is a process in which when it is detected that the PCI conflict exists in at least two cells, a PCI is reassigned to a conflicted cell. After PCI optimization is performed, no PCI conflict exists in cells. It should be understood that in this case, PCI conflicted cells may be the detected at least two cells in which the PCI conflict exists, or the PCI conflicted cells may include the at least two cells, and the PCI conflicted cells may further include another cell. This is because in a process of performing PCI optimization, a global consideration needs to be taken into account. In a process of reassigning a PCI to one or all of the at least two cells in which the conflict exists, the PCI conflict may occur between other cells. Therefore, PCI optimization also needs to be performed on related cells. In other words, actually, there may be more PCI conflicted cells on which PCI optimization is performed than the detected at least two cells. That is, the PCI conflicted cells include the detected at least two cells in which the PCI conflict exists.

Based on the problem existing in the background, the embodiments of this application provide a PCI conflict detection and optimization method, an apparatus, and a system, and the method, the apparatus, and the system may be used in but are not limited to a 5G NR network. The 5G NR network is used as an example for description in the embodiments of this application. The 5G NR network includes a control network element, a radio access network element, a management network element, and the like. After a first control network element receives a PCI conflict detection notification message, the first control network element detects that a PCI conflict exists in at least two cells. If the at least two cells in which the PCI conflict exists are cells managed by the first control network element, the first control network element performs PCI optimization on PCI conflicted cells managed by the first control network element; or if at least one of the at least two cells in which the PCI conflict exists is not a cell managed by the first control network element, and the at least one cell is a cell managed by a second control network element, the first control network element sends a first PCI optimization request message to a first management network element. If the first management network element determines, based on the first PCI optimization request cell, that a vendor name of the first control network element is the same as a vendor name of the second control network element, the first management network element performs PCI optimization on PCI conflicted cells managed by the first management network element; or if a vendor name of the first control network element is different from a vendor name of the second control network element, the first management network element sends a second PCI optimization request message to a second management network element, so that the second management network element performs PCI optimization on PCI conflicted cells managed by the second network element. According to the technical solutions provided in the embodiments of this application, PCI conflict detection and optimization in the 5G NR network can be smoothly performed.

The PCI conflict detection and optimization method and the apparatus that are provided in the embodiments of this application may be used in a wireless communication system. The wireless communication system may be an architecture in which the CU and the DU are split in the 5G NR network, and may be used in two wireless communication systems. A first wireless communication system includes an ONAP, one or more EMSs, one or more CUs, and one or more DUs. It may be understood that each DU correspondingly manages user equipment in one or more cells. The ONAP is connected to the one or more EMSs, each EMS is connected to one or more CUs, each CU is connected to one or more DUs, and the EMS may directly manage the CU and the DU. It should be noted that the foregoing network elements are wirelessly connected.

The ONAP is a network functional entity that implements automatic management in an operator network. The ONAP is configured to perform configuration management, network resource management, cross-vendor network device collaborative management, and the like on each network element (for example, the CU or the DU).

The EMS is an element management system in the operator network, and is configured to manage the CU and the DU.

The CU is a centralized control unit in a wireless network, and implements functions, such as wireless connection management and encryption and decryption, of a radio resource control (RRC) layer or a packet data convergence protocol layer.

The DU is a distributed unit in the wireless network, and implements functions, such as data retransmission and channel mapping, of a radio link control (RLC) layer, a medium access control (MAC) layer, or a physical (PHY) layer.

FIG. 2(*a*) is a schematic architectural diagram of the first wireless communication system according to an embodiment of this application. Two EMSs managed by an ONAP 10 are respectively denoted as an EMS 11*a* and an EMS 11*b*. CUs managed by the EMS 11*a* are denoted as a CU 12*a* and a CU 12*b*, a CU managed by the EMS 11*b* is denoted as a CU 12*c*, a DU managed by the CU 12*a* is denoted as a DU 13*a*, DUs managed by the CU 12*b* are denoted as a DU 13*b* and a DU 13*c*, and a DU managed by the CU 12*c* is denoted as a DU 13*d*.

A second wireless communication system provided in the embodiments of this application includes an ONAP, one or more CUs, and one or more DUs. It may be understood that each DU correspondingly manages user equipment in one or more cells. The ONAP is connected to the one or more CUs, and each CU is connected to one or more DUs. It should be noted that the foregoing network elements are wirelessly connected. Different from the foregoing first wireless communication system, the second wireless communication system does not include the EMS, and the ONAP directly manages the CU or the DU. FIG. 2(b) is a schematic architectural diagram of the second wireless communication system according to an embodiment of this application. CUs managed by an ONAP 20 are denoted as a CU 21a and a CU 21b, DUs managed by the CU 21a are denoted as a DU 22a and a DU 22b, and a DU managed by the CU 21b is denoted as a DU 22c.

Figure 2A:
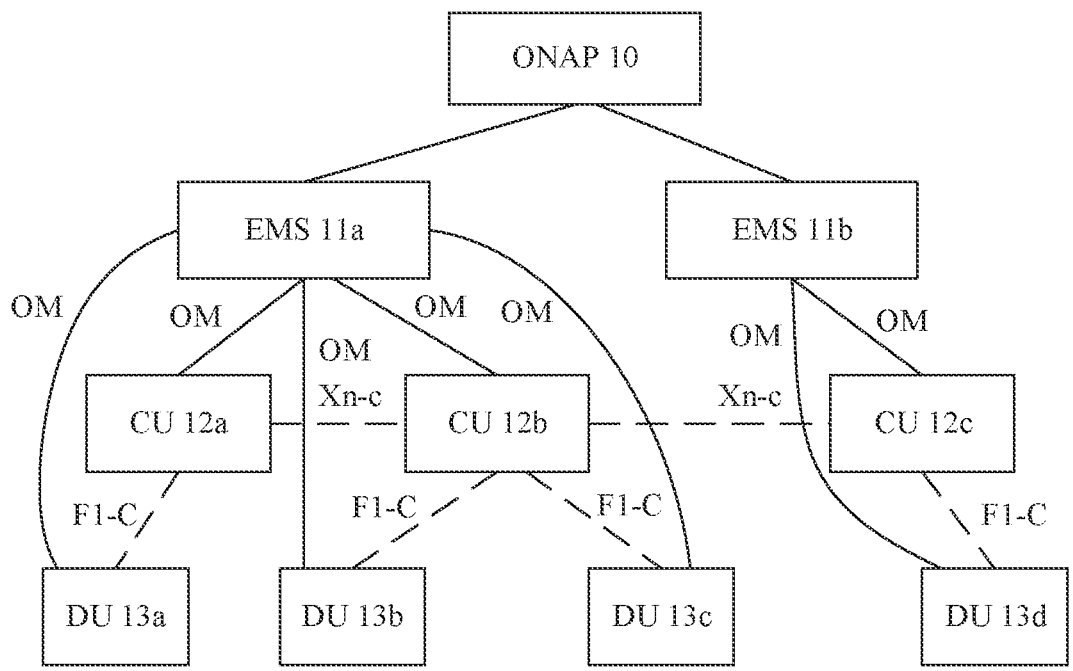
FIG. 2(a) and FIG. 2(b) are a schematic architectural diagram of a wireless communication system according to an embodiment of this application.
Figure 2B:
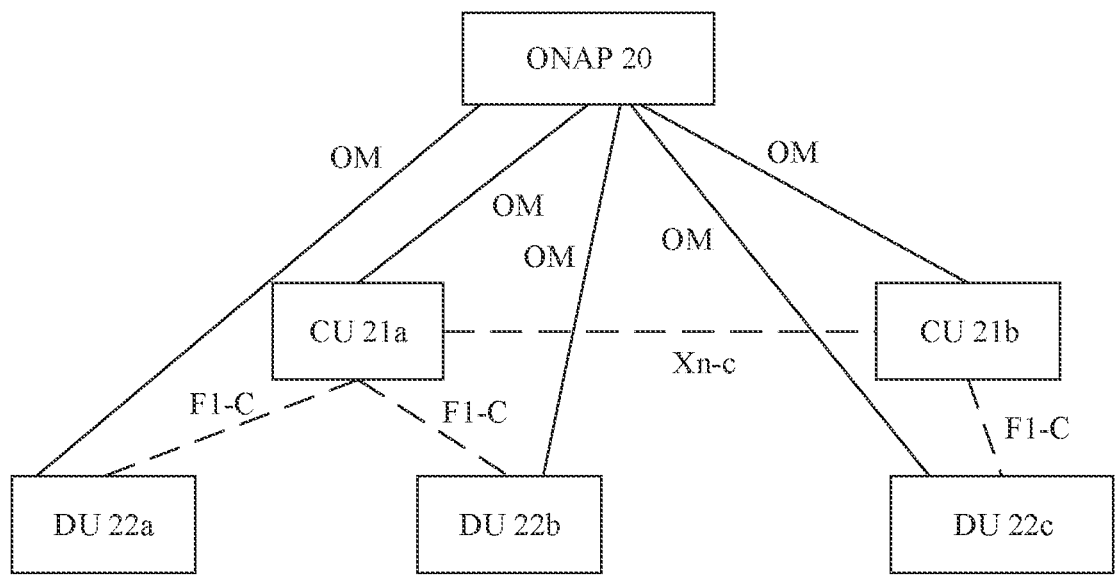

With reference to FIG. 2(a) and FIG. 2(b), it should be understood that, in the embodiments of this application, the control network element may be the CU, the radio access network element may be the DU, and the management network element may include a network element integrated with an EMS function and a network element integrated with an ONAP function. In addition, the ONAP is an upper-level management network element of the EMS. In the following embodiments, the first management network element refers to a network element having the EMS function (for example, a server integrated with the EMS function), and the second management network element refers to a network element having the ONAP function (for example, a server integrated with the ONAP function).

With reference to the foregoing wireless communication system in which the CU and the DU are split in the 5G NR network, the PCI conflict detection and optimization method provided in the embodiments of this application is mainly used to detect whether a PCI conflict exists in cells in a network, and perform PCI optimization on PCI conflicted cells. Specifically, under a trigger condition, the control network element may be triggered to perform PCI conflict detection. When the control network element detects that the PCI conflict exists, PCI optimization may be performed by different network elements based on different scenarios, for example, may be performed by the control network element or may be performed by the management network element such as the first management network element or the second management network element. The following describes in detail the PCI conflict detection and optimization method based on different scenarios.

Figure 3:
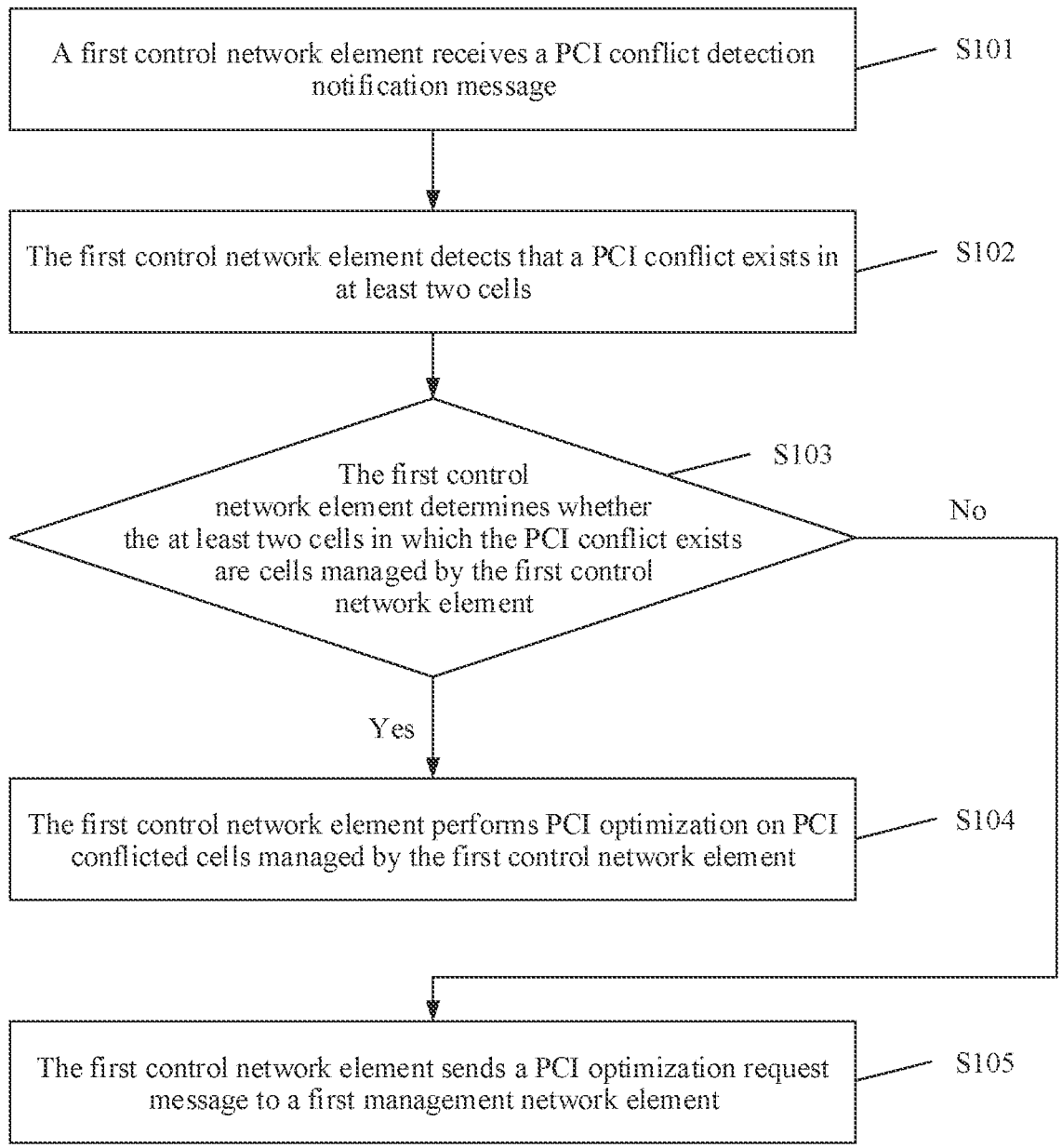
FIG. 3 is a schematic diagram 1 of a PCI conflict detection and optimization method according to an embodiment of this application.

As shown in FIG. 3, a PCI conflict detection and optimization method provided in an embodiment of this application may include S101 to S105.

S101: a first control network element receives a PCI conflict detection notification message.

The PCI conflict detection notification message is used to trigger the first control network element to perform PCI conflict detection. The first control network element may be a CU.

In an implementation, the PCI conflict detection notification message may be a neighbor relation notification message received by the first control network element from a first radio access network element, the neighbor relation notification message includes an NRT and an NCL that are corresponding to the first radio access network element, and the first radio access network element is one of radio access network elements managed by the first control network element. The first radio access network element may be a DU.

It may be understood that, that PCI conflict detection is triggered by using the neighbor relation notification message is the foregoing case in which PCI conflict detection is triggered by using an automatic neighbor relation detection function.

In another implementation, the PCI conflict detection notification message may be a PCI update notification message received by the first control network element from a second control network element, the PCI update notification message includes an NRT corresponding to the second control network element, a PCI of a first cell, an ECGI of the first cell, and a vendor name of the second control network element, the first cell is a cell on which PCI optimization is performed by the second control network element, and the foregoing at least two cells in which the PCI conflict exists include at least one cell managed by the first control network element and at least one cell of the first cell. The first control network element is adjacent to the second control network element.

Optionally, in this embodiment of this application, the PCI update notification message may alternatively be a PCI update notification message including the following information: the NRT corresponding to the second control network element, an NCL corresponding to the first control network element, and the vendor name of the second control network element.

In this embodiment of this application, after a neighboring control network element of the first control network element, namely, the second control network element, performs PCI optimization on a cell managed by the neighboring control network element, an optimization result of the neighboring control network element may cause a PCI conflict between a cell managed by the first control network element and a cell (namely, the first cell) on which optimization has been performed by the second control network element. Therefore, the second control network element may send a PCI optimization notification message to the first control network element, to trigger the first control network element to perform PCI conflict detection.

It may be understood that, that PCI conflict detection is triggered by using the PCI update notification message is the foregoing case in which PCI conflict detection is triggered by using an X2 interface message.

S102: the first control network element detects that a PCI conflict exists in at least two cells.

In this embodiment of this application, after the first control network element receives the PCI conflict detection notification message, the first control network element starts to perform PCI conflict detection, to determine whether the PCI conflict exists.

Figure 4:
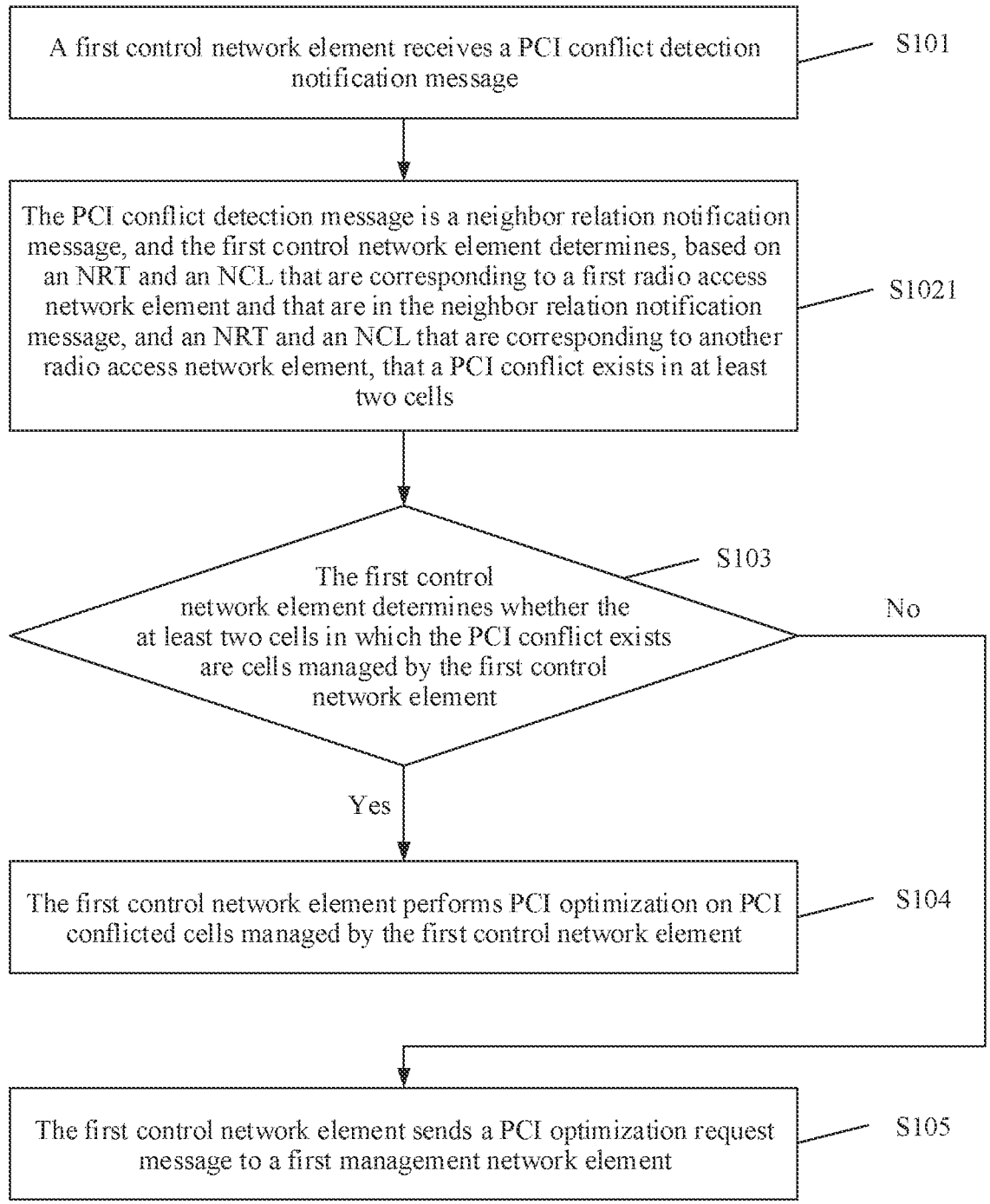
FIG. 4 is a schematic diagram 2 of a PCI conflict detection and optimization method according to an embodiment of this application.

Optionally, with reference to FIG. 3, as shown in FIG. 4, when the PCI conflict detection notification message is a neighbor relation notification message received by the first control network element from the first radio access network element, S102 may be specifically implemented by using S1021.

S1021: the PCI conflict detection message is the neighbor relation notification message, and the first control network element determines, based on the NRT and the NCL that are corresponding to the first radio access network element and that are in the neighbor relation notification message, and an NRT and an NCL that are corresponding to another radio access network element, that the PCI conflict exists in the at least two cells.

Both the first radio access network element and the another radio access network element are radio access network elements managed by the first control network element, and the first control network element may determine, based on the NRT and the NCL that are corresponding to the first radio access network element and that are in the neighbor relation notification message, and the NRT and the NCL that are corresponding to the another radio access network element, that the PCI conflict exists in the at least two cells, and may determine that the PCI conflict exists in which cells. Specifically, the first control network element determines, based on the NCL of the first radio access network element and the NCL of the another radio access network element, that which cells have a same PCI, that is, which cells reuse the PCI. Then, the first control network element determines, based on the NRT corresponding to the first radio access network element and/or the NRT corresponding to the another radio access network element, whether cells having the same PCI are neighboring cells (first-order neighboring cells, second-order neighboring cells, or the like), so as to determine the at least two cells in which the PCI conflict exists.

For example, if it is determined, based on the NCL, that a cell a managed by the radio access network element 1 and a cell B managed by a radio access network element 2 have a same PCI, and a cell C managed by the radio access network element 1 and a cell D managed by a radio access network element 3 have a same PCI, and it can be learned, based on the NRT corresponding to the radio access network element 1, that the cell A and the cell B are in a neighbor relation and the cell C and the cell D are not in a neighbor relation, it is determined that cells in which the PCI conflict exists are the cell A and the cell B.

Figure 5:
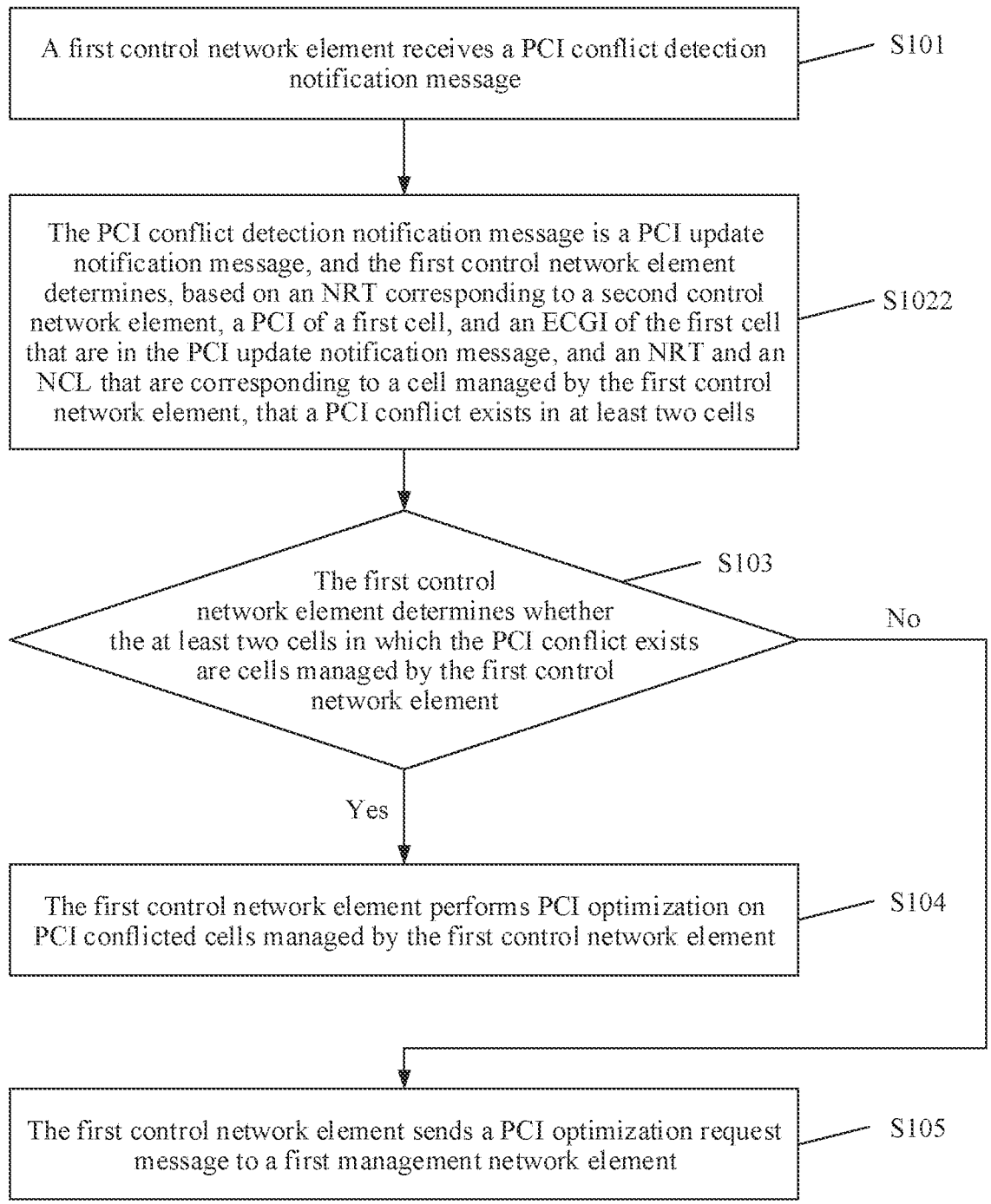
FIG. 5 is a schematic diagram 3 of a PCI conflict detection and optimization method according to an embodiment of this application.

Optionally, with reference to FIG. 3, as shown in FIG. 5, when the PCI conflict detection notification message is the PCI update notification message received by the first control network element from the second control network element, S102 may be specifically implemented by using S1022.

S1022: the PCI conflict detection notification message is the PCI update notification message. The first control network element determines, based on the NRT corresponding to the second control network element, the PCI of the first cell, and the ECGI of the first cell that are in the PCI update notification message, and an NRT and an NCL that are corresponding to the cell managed by the first control network element, that the PCI conflict exists in the at least two cells.

In this embodiment of this application, the first control network element determines, based on the NRT and the NCL that are locally stored by the first control network element, and the NRT corresponding to the second control network element, the PCI of the first cell, and the ECGI of the first cell that are in the PCI update notification message, that a PCI conflict exists in at least two cells (where the at least two cells include at least one of cells managed by the first control network element and at least one cell of the first cell), and may determine that the PCI conflict exists in which cells. Specifically, the first control network element determines, based on the PCI of the first cell, the ECGI of the first cell, and the NCL corresponding to the first control network element, that which cells of the first cell have same PCIs as which cells of the cells managed by the first control network element, and further determines, based on the NRT corresponding to the second control network element and/or the NRT corresponding to the first control network element, whether cells having the same PCI are neighboring cells (first-order neighboring cells, second-order neighboring cells, or the like), so as to determine the at least two cells in which the PCI conflict exists.

It should be understood that the method for determining the at least two cells in which the PCI conflict exists in S1022 is similar to the method for determining the at least two cells in which the PCI conflict exists in S1021, and for details, refer to the foregoing related description of S1021.

Optionally, when the PCI update notification includes the NRT corresponding to the second control network element, the NCL corresponding to the first control network element, and the vendor name of the second control network element, the first control network element determines, based on the NRT and the NCL that are corresponding to the first control network element and the NRT and the NCL that are corresponding to the second control network element, that the PCI conflict exists in the at least two cells. A specific method is similar to that in S1021, and details are not described herein again.

S103: the first control network element determines whether the at least two cells in which the PCI conflict exists are cells managed by the first control network element.

In this embodiment of this application, when the first control network element detects that a PCI conflict exists in at least two cells, before performing PCI optimization, the first control network element first determines whether the at least two cells are cells managed by the first control network element. When the at least two cells in which the PCI conflict exists are cells managed by the first control network element, the first control network element may optimize PCI conflicted cells managed by the first control network element (where the PCI conflicted cells include the at least two cells). Otherwise, when at least one of the at least two cells in which the PCI conflict exists is not a cell managed by the first control network element, the first control network element has no permission to perform PCI optimization on PCI conflicted cells (where the PCI conflicted cells include the at least two cells).

The method for determining, by the first control network element, whether the at least two cells in which the PCI conflict exists are cells managed by the first control network element may include: The first control network element determines, based on ECGIs of the at least two cells, whether the at least two cells are cells managed by the first control network element.

It should be understood that, if the PCI conflict detection notification message is the neighbor relation notification message sent by the first radio access network element, the at least two cells, in which the PCI conflict exists, that are detected by the first control network element need to be cells managed by the first control network element. This is because the first radio access network element is a radio access network element managed by the first control network element, and the at least two cells are cells managed by the first radio access network element. Therefore, the at least two cells are cells managed by the first control network element. If the PCI conflict detection notification message is the PCI update notification message sent by the second control network element, whether at least one cell of the first cell is a cell managed by the first control network element is determined based on an ECGI of the at least one cell of the first cell (where the at least one cell of the first cell is a cell in which the PCI conflict occurs with at least one of cells managed by the first control network element). If the at least one cell of the first cell is a cell managed by the first control network element, the first control network element may determine that the at least two cells in which the PCI conflict occurs are cells managed by the first control network element.

In this embodiment of this application, if the at least two cells in which the PCI conflict exists are cells managed by the first control network element, the first control network element performs the following S104. If at least one of the at least two cells in which the PCI conflict exists is not a cell managed by the first control network element, the first control network element performs the following S105.

S104: the first control network element performs PCI optimization on the PCI conflicted cells managed by the first control network element.

S105: the first control network element sends a PCI optimization request message to a first management network element.

The first management network element may be a network element having an EMS function, and the PCI optimization request message is used to request the first management network element to perform PCI optimization on the PCI conflicted cells.

In this embodiment of this application, if the first control network element determines that at least one of the at least two cells in which the PCI conflict exists is not a cell managed by the first control network element, the first control network element has no permission to perform PCI optimization on the PCI conflicted cells. In this case, the first control network element needs to request an upper-level network element (namely, the first management network element) of the first control network element to perform PCI optimization.

According to the PCI conflict detection and optimization method provided in this embodiment of this application, after the first control network element receives the PCI conflict detection notification message, the first control network element detects that a PCI conflict exists in at least two cells. If the at least two cells in which the PCI conflict exists are cells managed by the first control network element, the first control network element performs PCI optimization on the PCI conflicted cells managed by the first control network element. If at least one of the at least two cells in which the PCI conflict exists is not a cell managed by the first control network element, and the at least one cell is a cell managed by a second control network element, the first control network element sends the PCI optimization request message (that is, a first optimization request message in the following embodiment) to the first management network element. In this way, PCI conflict detection and optimization in a 5G NR network can be smoothly implemented.

Figure 6:
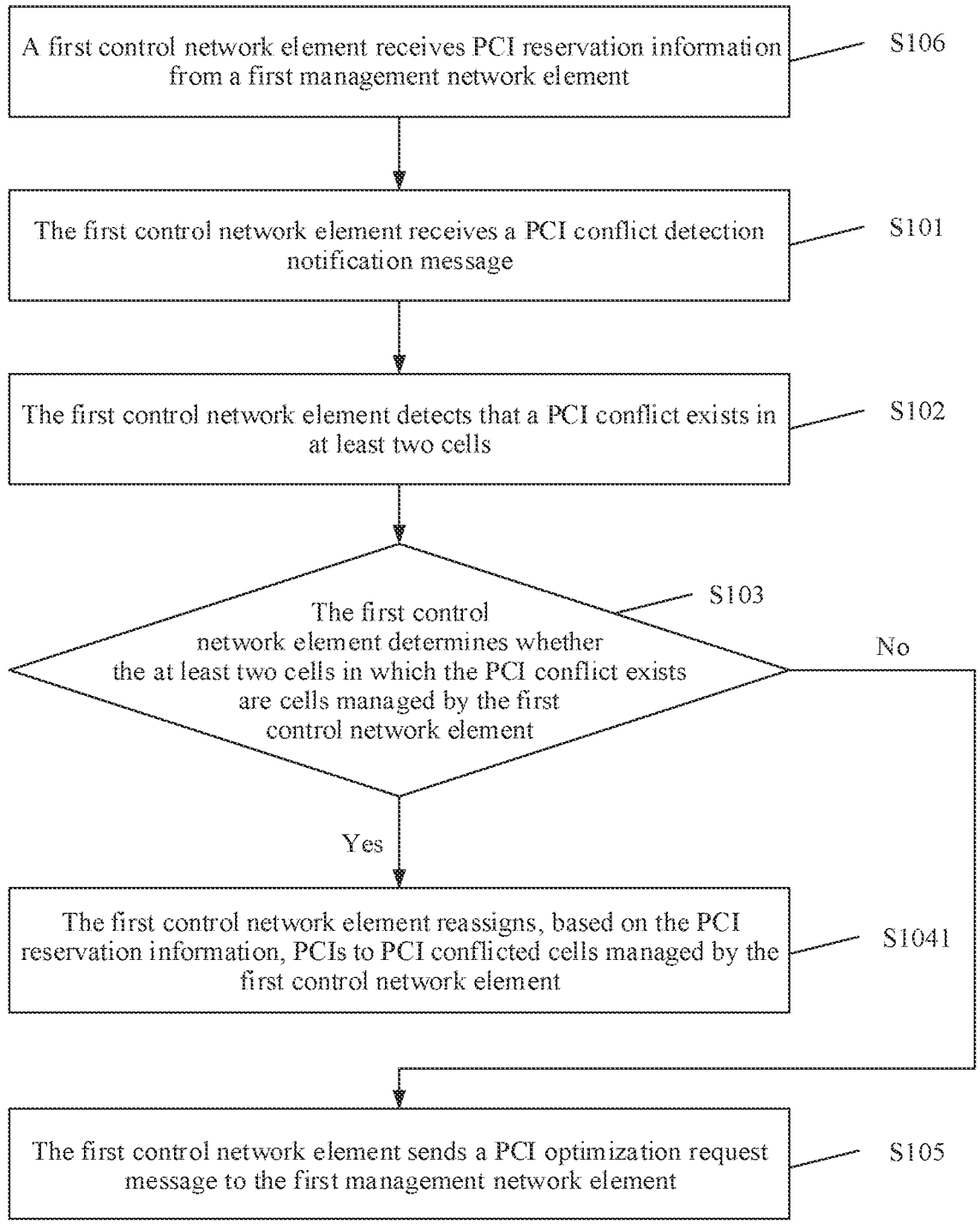
FIG. 6 is a schematic diagram 4 of a PCI conflict detection and optimization method according to an embodiment of this application.

Optionally, with reference to FIG. 3, as shown in FIG. 6, the PCI conflict detection and optimization method provided in this embodiment of this application may further include S106.

S106: the first control network element receives PCI reservation information from the first management network element.

The PCI reservation information is PCI reservation information corresponding to the first control network element, the PCI reservation information includes at least one assignable PCI, and the at least one assignable PCI refers to a PCI that can be assigned to the cell managed by the first control network element.

With reference to S106, as shown in FIG. 6, S104 may be specifically implemented by using S1041.

S1041: the first control network element reassigns, based on the PCI reservation information, PCIs to the PCI conflicted cells managed by the first control network element.

In this embodiment of this application, that the first control network element reassigns the PCIs to the PCI conflicted cells based on the PCI reservation information means that the first control network element reassigns a PCI to at least one cell of the PCI conflicted cells, or may be understood as that the first control network element may reassign PCIs to some cells or all cells of the PCI conflicted cells. In this way, a PCI conflict problem is resolved.

It should be understood that the PCI conflicted cells may be the foregoing detected at least two cells in which the PCI conflict exists, that is, the PCI conflicted cells include only the at least two cells. The PCI conflicted cells may alternatively include another cell different from the foregoing detected at least two cells in which the PCI conflict exists, that is, the PCI conflicted cells include the at least two cells and the another cell.

With reference to related descriptions in S101 to S105, the following describes, from a perspective of interaction between network elements, the PCI conflict detection and optimization method provided in this embodiment of this application.

Figure 7A:
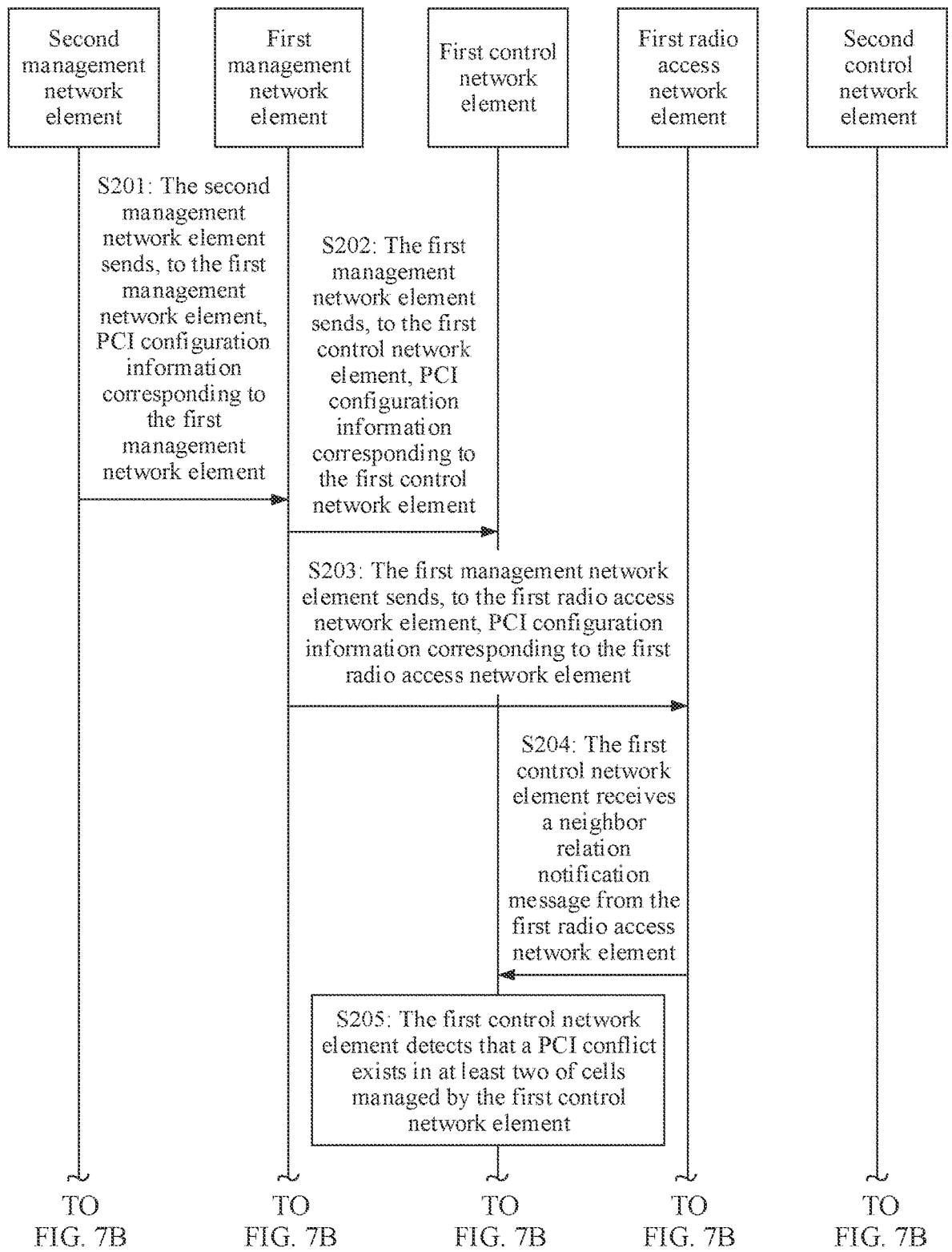
FIG. 7A and FIG. 7B are a schematic diagram 5 of a PCI conflict detection and optimization method according to an embodiment of this application.
Figure 7B:
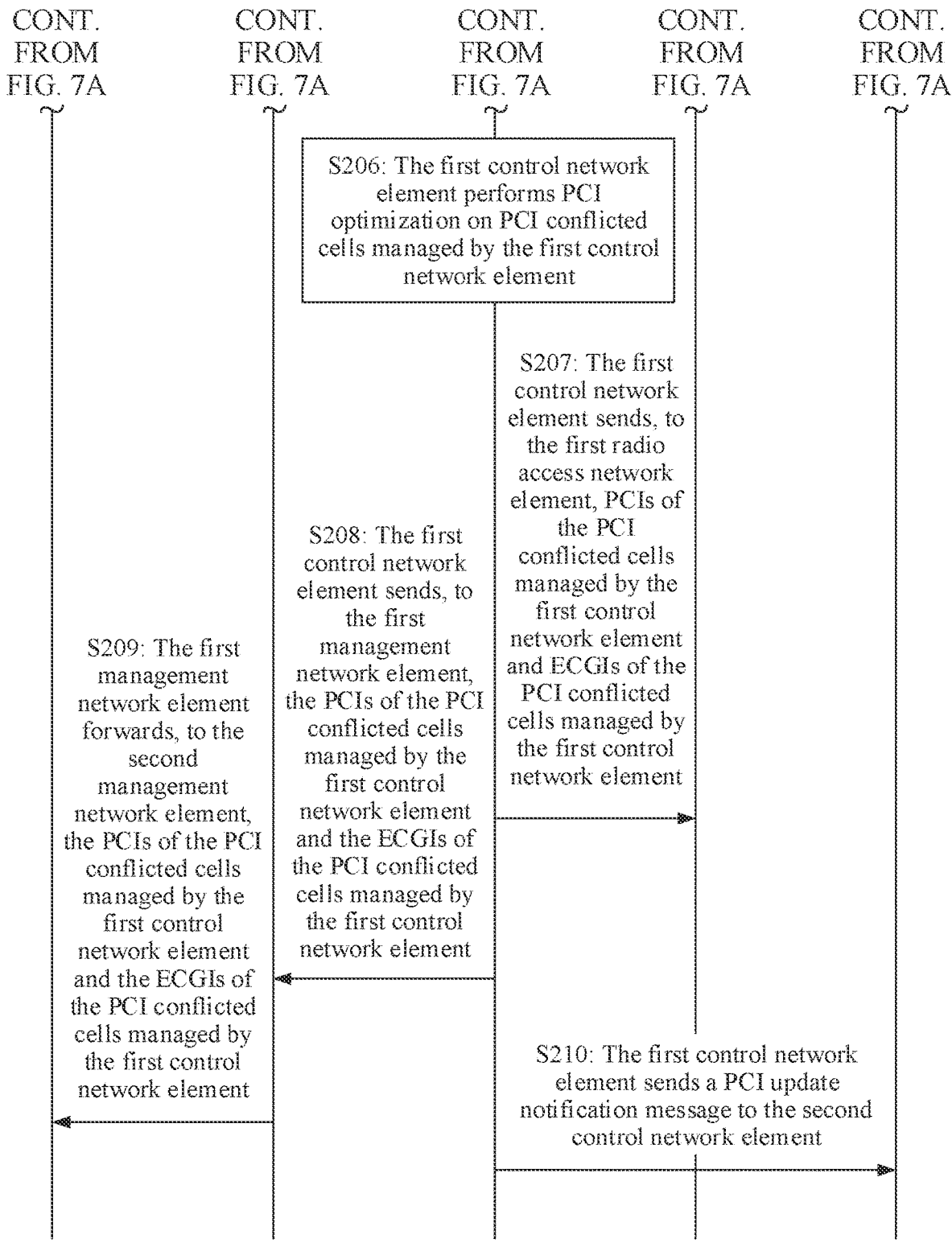

As shown in FIG. 7A and FIG. 7B, in an implementation, a PCI conflict detection and optimization method provided in an embodiment of this application may include S201 to S210.

S201: a second management network element sends, to a first management network element, PCI configuration information corresponding to the first management network element.

The second management network element may be a network element having an ONAP function, and the first management network element may be a network element having an EMS function.

In this embodiment of this application, the second management network element stores the PCI configuration information, and the PCI configuration information may include PCI configuration information corresponding to each of at least one first management network element managed by the second management network element. One first management network element is used as an example. The PCI configuration information received by the first management network element may include PCI configuration information corresponding to one or more control network elements managed by the first management network element, or PCI configuration information corresponding to one or more radio access network elements managed by the first management network element, where the PCI configuration information is used to initially configure each control network element or each radio access network element. For one control network element, PCI configuration information corresponding to the control network element includes PCI reservation information, and an ECGI and a PCI that are of a cell managed by the control network element. For one radio access network element, PCI configuration information corresponding to the radio access network element includes an ECGI and a PCI of a cell managed by the radio access network element.

S202: the first management network element sends, to a first control network element, PCI configuration information corresponding to the first control network element.

The first management network element may manage at least one control network element, and the PCI configuration information corresponding to the first management network element includes PCI configuration information corresponding to the at least one control network element managed by the first management network element. The PCI configuration information corresponding to the first control network element includes PCI reservation information corresponding to the first control network element, and an ECGI and a PCI that are of a cell managed by the first control network element, where the PCI reservation information corresponding to the first control network element includes a PCI that can be assigned to the cell managed by the first control network element.

Optionally, in this embodiment of this application, the PCI configuration information that is corresponding to the first management network element and that is sent by the second management network element to the first management network element may carry identifier information of the control network element. In this way, when receiving the PCI configuration information corresponding to the first management network element, the first management network element may further send, based on the identifier information of the control network element to the control network element identified by the identifier information of the control network element, PCI configuration information network element manages two control network elements, which are respectively a control network element C and a control network element D, where the control network element C controls and manages two radio access network elements, which are respectively a radio access network element E and a radio access network element F. The control network element D controls and manages one radio access network element, which is a radio access network element G. In other words, radio access network elements managed by the first management network element A include the radio access network element E, the radio access network element F, and the radio access network element G. In this case, the following Table 1 is an example of content included in various PCI configuration information.

TABLE 1

| PCI configuration information | Details |
| --- | --- |
| PCI configuration information stored by the second management network element | PCI configuration information corresponding to the first management network element A<br>PCI configuration information corresponding to the first management network element B |
| PCI configuration information corresponding to the first management network element | PCI configuration information corresponding to the control network element C<br>PCI configuration information corresponding to the control network element D |
| PCI configuration information corresponding to the first management network element | PCI configuration information of the radio access network element E<br>PCI configuration information of the radio access network element F<br>PCI configuration information of the radio access network element G | corresponding to the control network element. The first control network element is used as an example. After receiving the PCI configuration information corresponding to the first management network element, the first management network element obtains identifier information of the first control network element by parsing the PCI configuration information, and then the first management network element may send, to the first control network element, PCI configuration information corresponding to the identifier information.

Optionally, the identifier information of the control network element may be an IP of the control network element, or may be other identifier information that meets a use requirement. This is not specifically limited in this embodiment of this application.

S203: the first management network element sends, to a first radio access network element, PCI configuration information corresponding to the first radio access network element.

It may be understood that the first management network element may manage at least one control network element, or the first management network element may directly manage at least one radio access network element, and the at least one radio access network element belongs to a same control network element or different control network elements. The PCI configuration information of the first radio access network element may include an ECGI and a PCI of a cell managed by the first radio access network element.

For example, it is assumed that the second management network element manages two first management network elements, which are respectively a first management network element A and a first management network element B, and the first management network element in S101 is the first management network element A. The first management S204: the first control network element receives a neighbor relation notification message from the first radio access network element.

The first radio access network element is a radio access network element managed by the first control network element. For detailed descriptions of the neighbor relation notification message, refer to the description of the neighbor relation notification message in S101. Details are not described herein again.

S205: the first control network element detects that a PCI conflict exists in at least two of cells managed by the first control network element.

With reference to the related description in the foregoing embodiment, the neighbor relation notification message triggers the first control network element to perform PCI conflict detection. In this case, the at least two cells, in which the PCI conflict exists, that are detected by the first control network element need to belong to the cells managed by the first control network element.

S206: the first control network element performs PCI optimization on PCI conflicted cells managed by the first control network element.

It should be understood that, in this embodiment of this application, after the first control network element completes PCI optimization, the first control network element may also update an NRT and an NCL that are locally stored by the first control network element.

S207: the first control network element sends, to the first radio access network element, PCIs of the PCI conflicted cells managed by the first control network element and ECGIs of the PCI conflicted cells managed by the first control network element.

It should be noted that in this embodiment of this application, in S207, the PCIs that are of the PCI conflicted cells managed by the first control network element and that are sent by the first control network element to the first radio access network element are PCIs reassigned by the first control network element to the PCI conflicted cells managed by the first control network element. That is, the PCI may be understood as a PCI of a conflicted cell on which PCI optimization has been performed. If the PCI is involved in the following, details are not described again.

In this embodiment of this application, the first control network element sends, to the first radio access network element, the PCIs of the PCI conflicted cells managed by the first control network element and the ECGIs of the PCI conflicted cells managed by the first control network element is used by the first radio access network element to update an NRT and an NCL that are locally stored by the first radio access network element.

S208: the first control network element sends, to the first management network element, the PCIs of the PCI conflicted cells managed by the first control network element and the ECGIs of the PCI conflicted cells managed by the first control network element.

Similarly, that the first control network element sends, to the first management network element, the PCIs of the PCI conflicted cells managed by the first control network element and the ECGIs of the PCI conflicted cells managed by the first control network element is used by the first management network element to update an NRT and an NCL that are locally stored by the first management network element.

S209: the first management network element forwards, to the second management network element, the PCIs of the PCI conflicted cells managed by the first control network element and the ECGIs of the PCI conflicted cells managed by the first control network element.

On one hand, that the first management network element forwards, to the second management network element, the PCIs of the PCI conflicted cells managed by the first control network element and the ECGIs of the PCI conflicted cells managed by the first control network element is used by the second management network element to update an NRT and an NCL that are locally stored by the second management network element.

On the other hand, the second management network element may further update the PCI reservation information based on the PCIs that are of the PCI conflicted cells managed by the first control network element and that are sent by the first management network element.

In this embodiment of this application, because the first control network element has performed PCI optimization on the PCI conflicted cells based on the PCI reservation information corresponding to the first control network element, that is, some PCIs in the PCI reservation information corresponding to the first control network element have been assigned to cells in which the PCI conflict occurs, some PCIs in the PCI reservation information are invalid. The second management network element updates the PCI reservation information locally stored by the second management network element, so as to ensure availability of the PCI reservation information, thereby facilitating smooth execution of possible subsequent PCI optimization.

S210: the first control network element sends a PCI update notification message to the second control network element.

The PCI update notification message includes an NRT corresponding to the first control network element, the PCIs of the PCI conflicted cells managed by the first control network element, the ECGIs of the PCI conflicted cells managed by the first control network element, and a vendor name of the first control network element, and the first control network element is adjacent to the second control network element.

In this embodiment of this application, after the first control network element performs PCI optimization on the PCI conflicted cells managed by the first control network element, an optimization result of the first control network element may cause a PCI conflict between a cell managed by the first management network element and a cell managed by the second control network element adjacent to the first control network element. Therefore, after the first control network element completes PCI optimization, the first control network element sends the PCI update notification message to the second control network element, to trigger the second control network element to start PCI conflict detection.

Figure 8A:
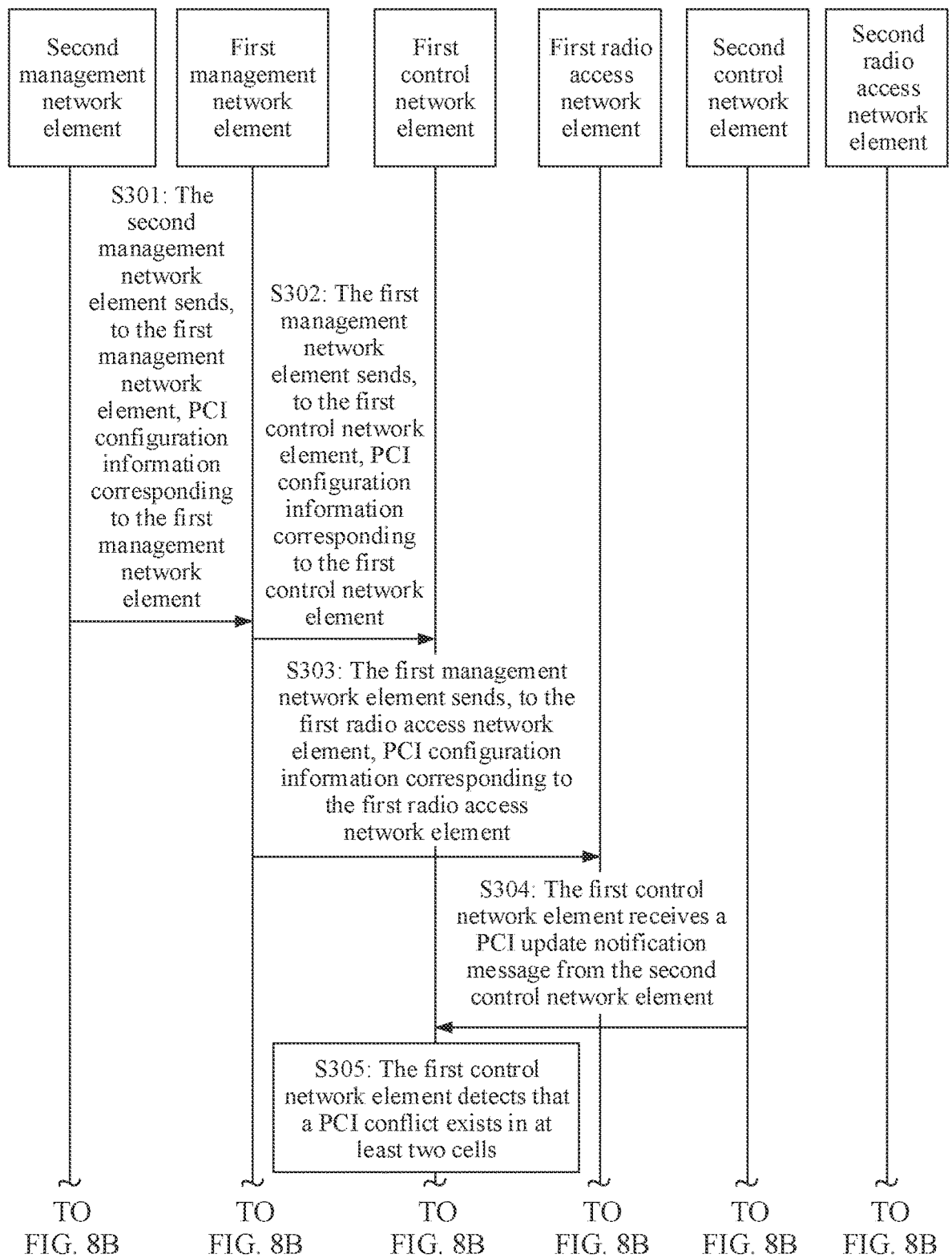
FIG. 8A and FIG. 8B are a schematic diagram 6 of a PCI conflict detection and optimization method according to an embodiment of this application.
Figure 8B:
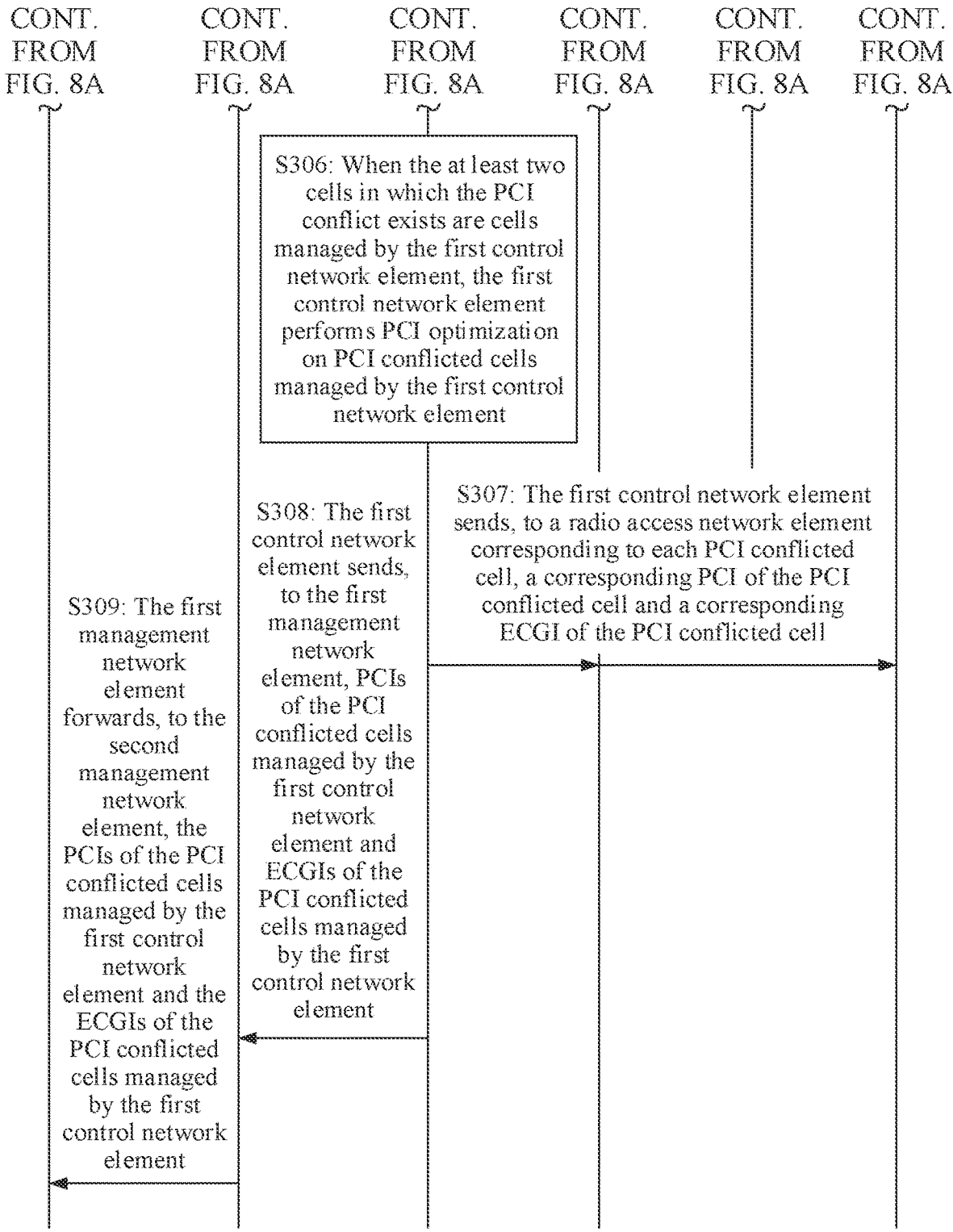
Figure 9A:
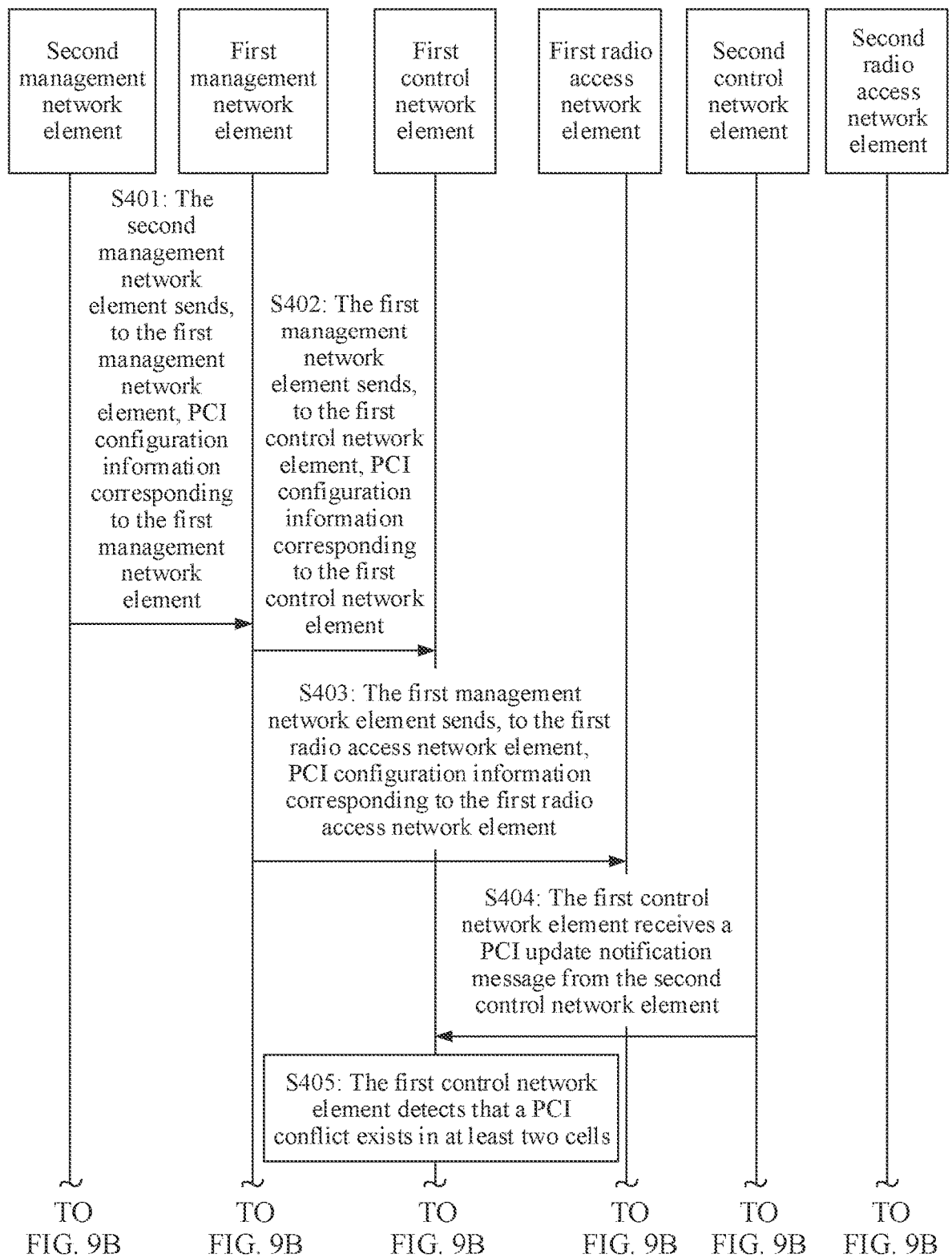
FIG. 9A to FIG. 9D are a schematic diagram 7 of a PCI conflict detection and optimization method according to an embodiment of this application.
Figure 9B:
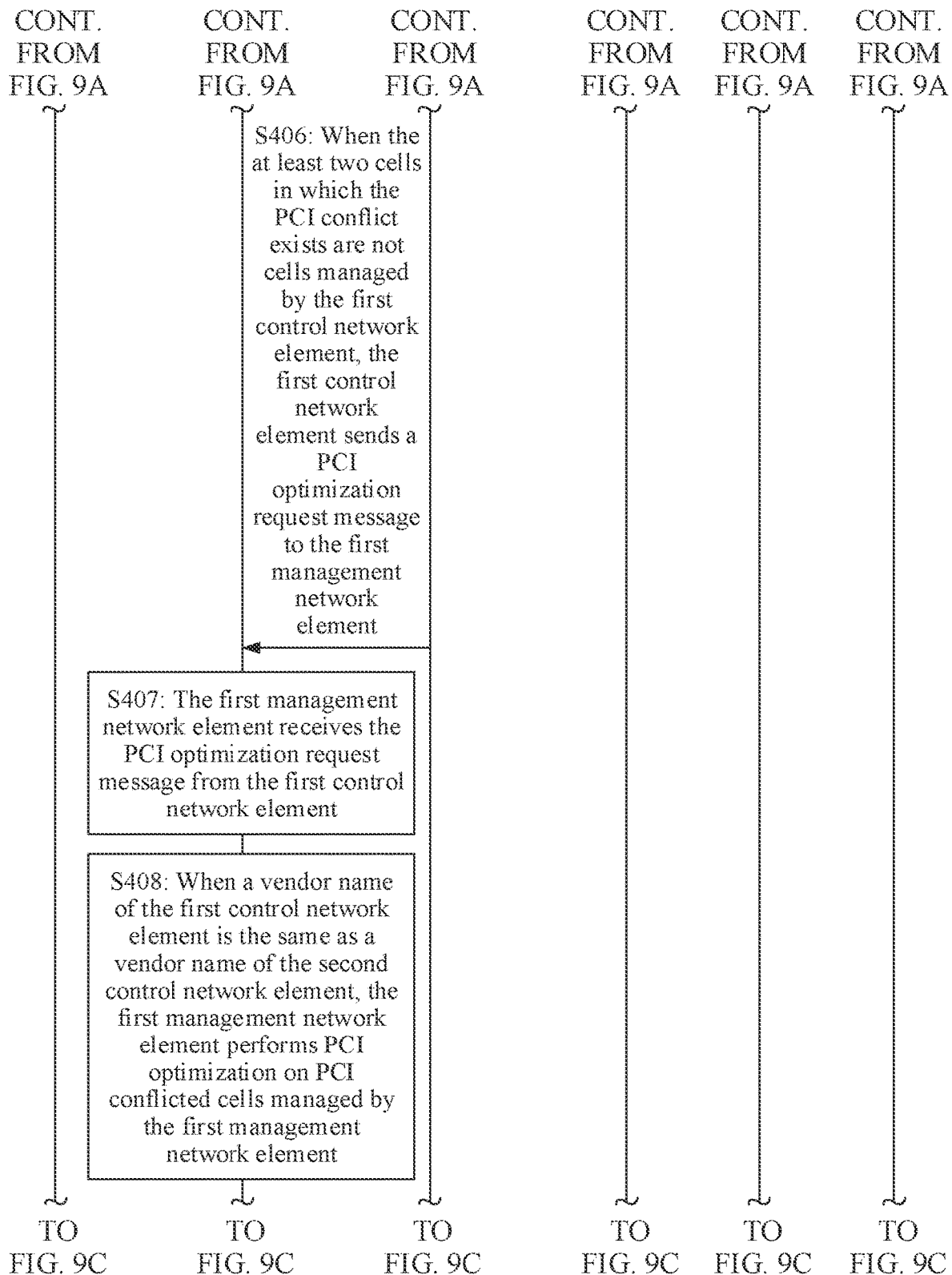
Figure 9C:
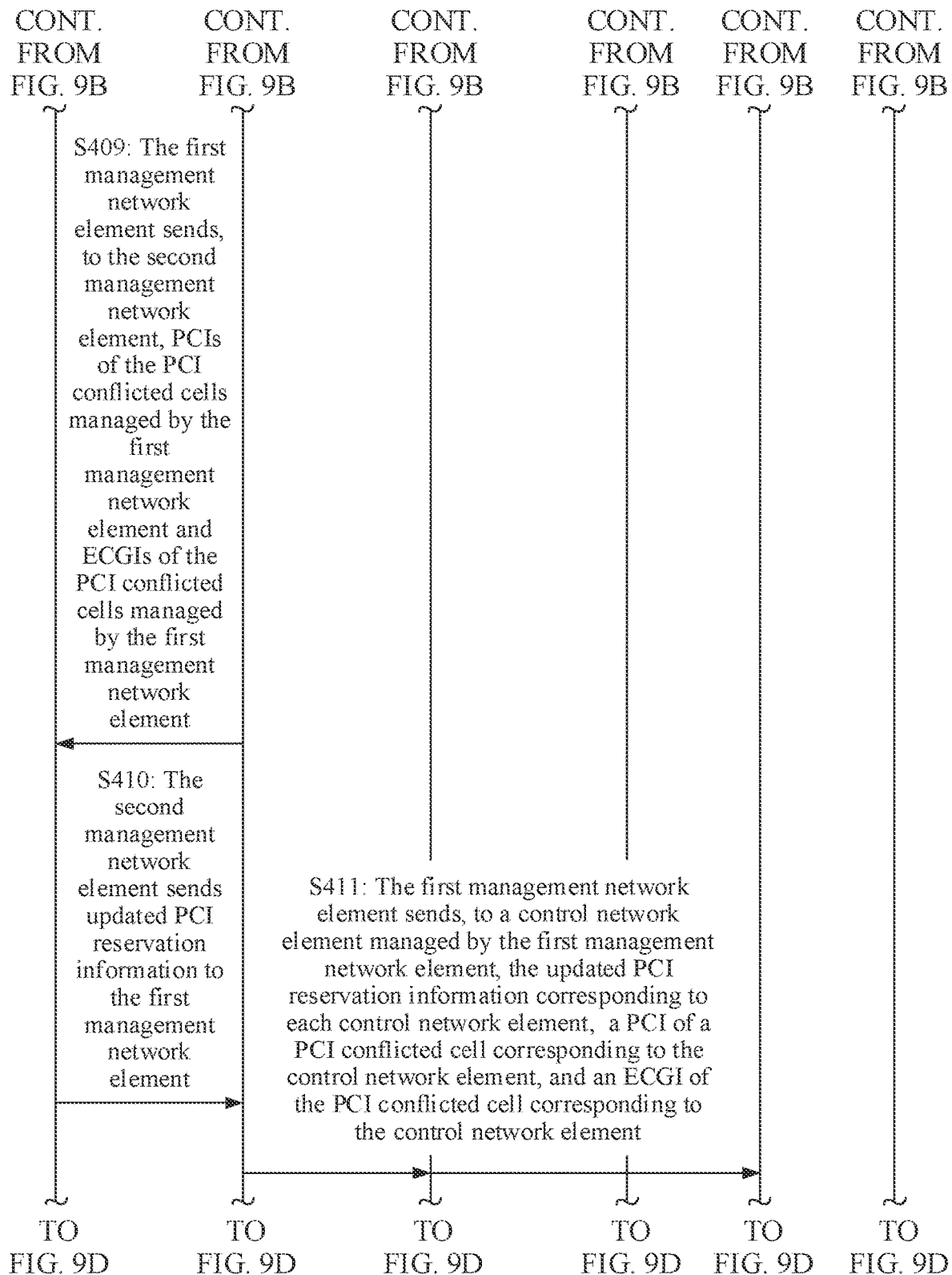
Figure 9D:
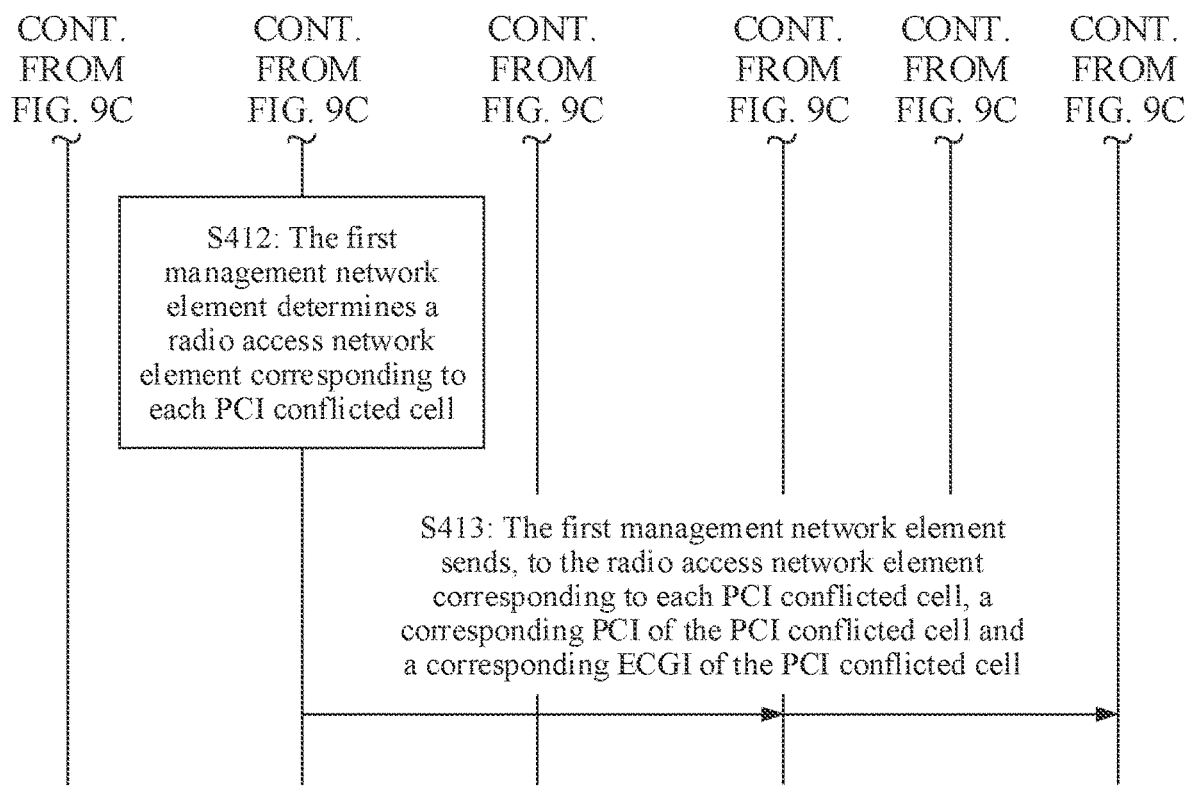
Figure 10A:
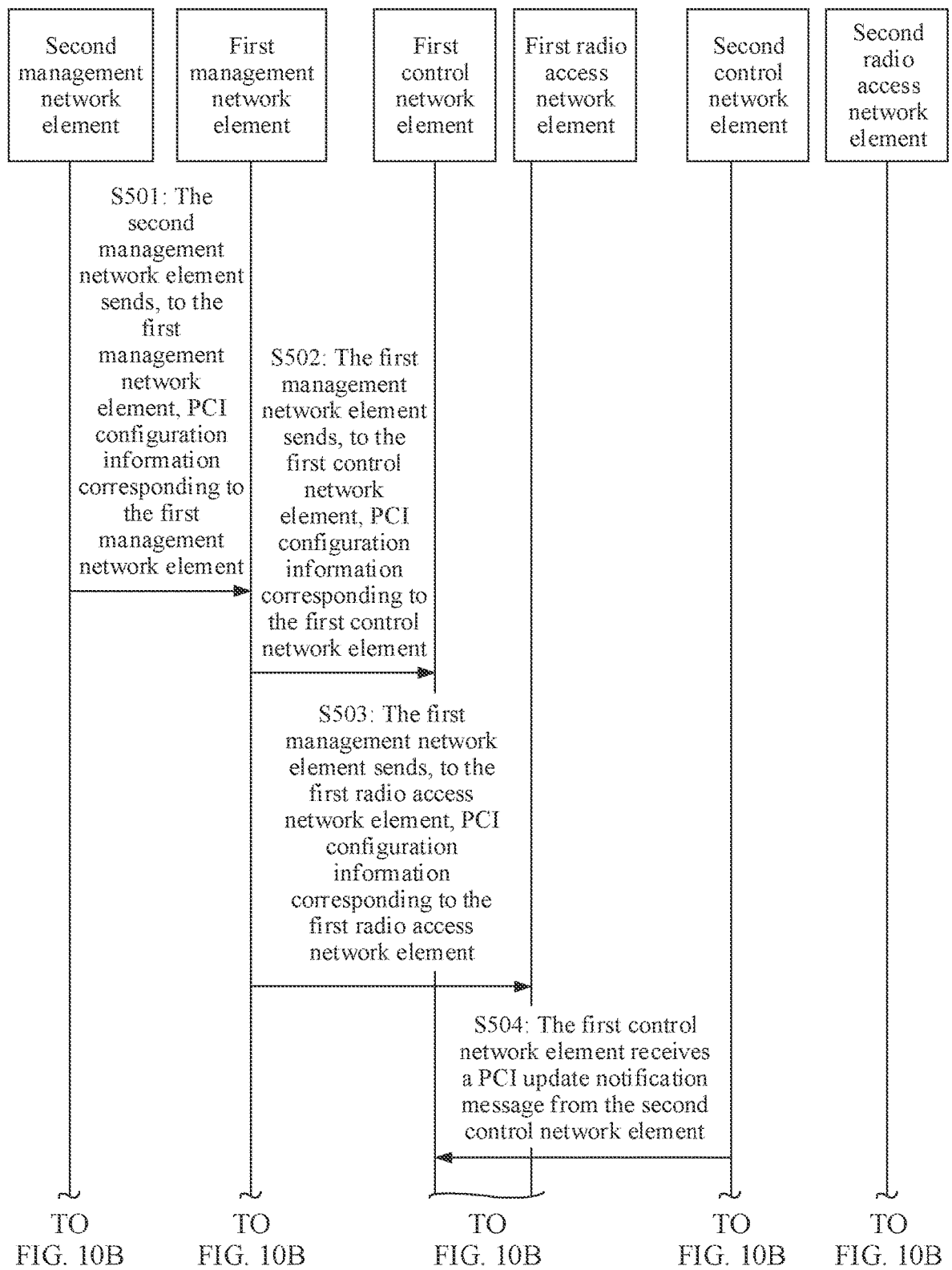
FIG. 10A to FIG. 10D are a schematic diagram 8 of a PCI conflict detection and optimization method according to an embodiment of this application.
Figure 10B:
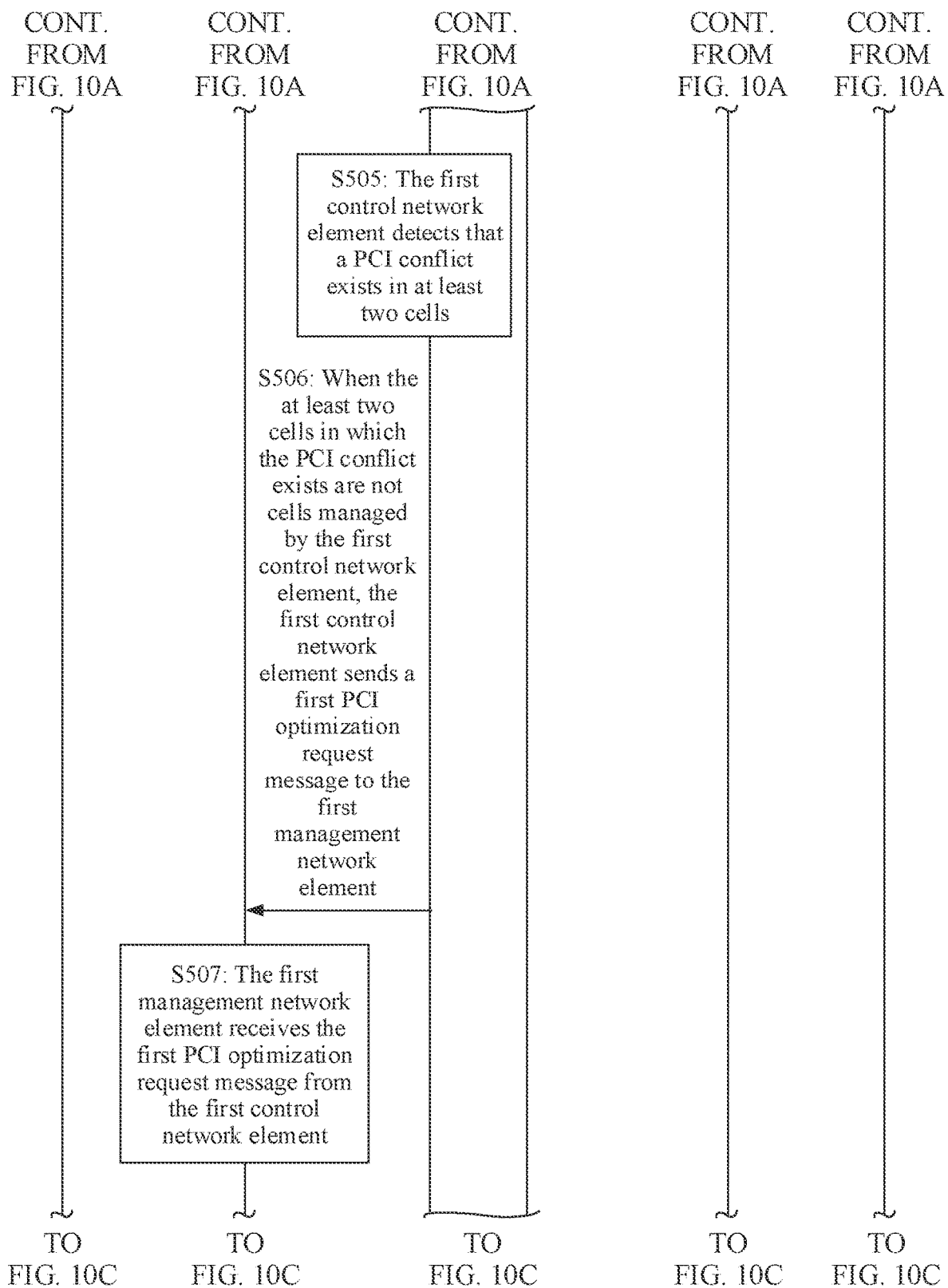
Figure 10C:
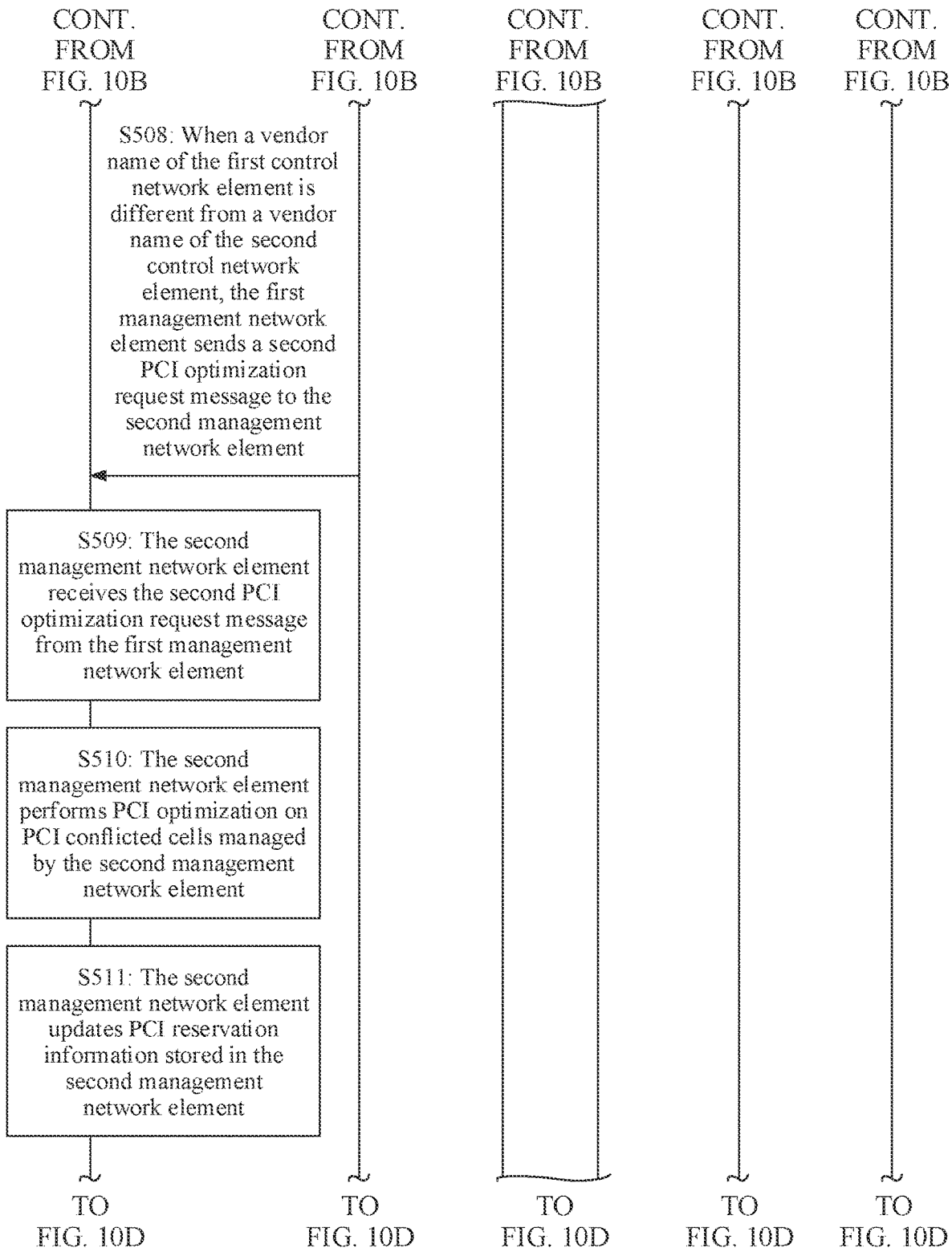
Figure 10D:
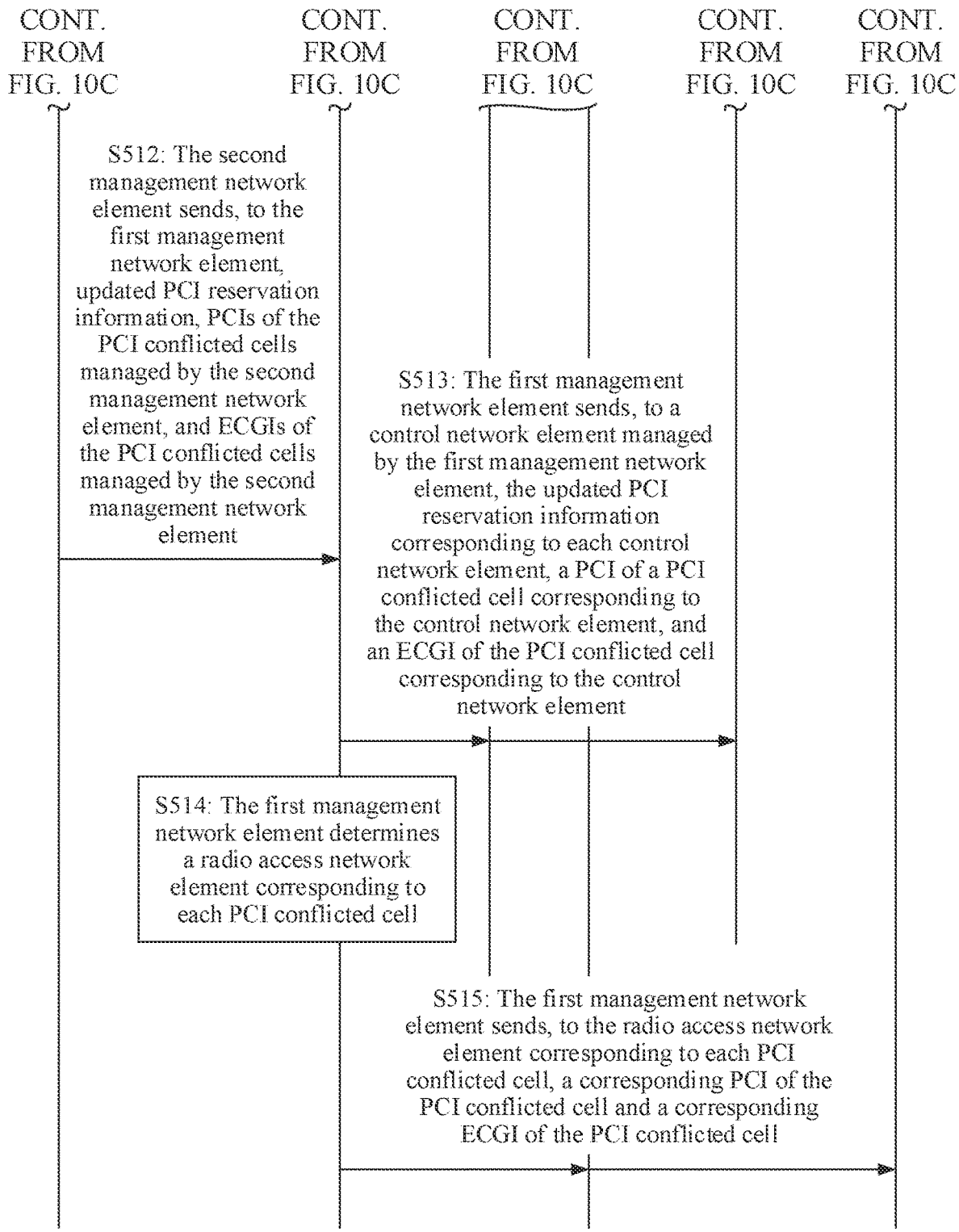

As shown in FIG. 8A and FIG. 8B, in another implementation, a PCI conflict detection and optimization method provided in an embodiment of this application may include S301 to S309.

S301: a second management network element sends, to a first management network element, PCI configuration information corresponding to the first management network element.

S302: the first management network element sends, to a first control network element, PCI configuration information corresponding to the first control network element.

S303: the first management network element sends, to a first radio access network element, PCI configuration information corresponding to the first radio access network element.

For detailed descriptions of S301 to S303, refer to related descriptions of S201 to S203. Details are not described herein again.

S304: the first control network element receives a PCI update notification message from a second control network element.

The PCI update notification message includes an NRT corresponding to the second control network element, a PCI of a first cell, an ECGI of the first cell, and a vendor name of the second control network element, the first cell is a cell on which PCI optimization is performed by the second control network element, and the at least two cells include at least one cell managed by the first control network element and at least one cell of the first cell.

For descriptions of other content in S304, refer to related descriptions about the PCI update notification message in S101. Details are not described herein again.

S305: the first control network element detects that a PCI conflict exists in at least two cells.

In this embodiment of this application, that the first control network element detects that a PCI conflict exists in at least two cells specifically includes: the first control network element determines that a PCI conflict exists in at least one of cells managed by the first control network element and at least one cell of the first cell. For other descriptions of S305, refer to the foregoing related descriptions of S1022. Details are not described herein again.

S306: when the at least two cells in which the PCI conflict exists are cells managed by the first control network element, the first control network element performs PCI optimization on PCI conflicted cells managed by the first control network element.

For detailed descriptions of S306, refer to the foregoing related descriptions of S104 (including S1041). Details are not described herein again.

S307: the first control network element sends, to a radio access network element corresponding to each PCI conflicted cell, a corresponding PCI of the PCI conflicted cell and a corresponding ECGI of the PCI conflicted cell.

In this embodiment of this application, after the first control network element performs PCI optimization on the PCI conflicted cells managed by the first control network element, the first control network element first determines the radio access network element corresponding to each PCI conflicted cell. Specifically, the first control network element may determine, based on the ECGI of the PCI conflicted cell, the radio access network element corresponding to the PCI conflicted cell, and then send, to the radio access network element corresponding to the PCI conflicted cell, the corresponding PCI of the PCI conflicted cell and the corresponding ECGI of the PCI conflicted cell, so that the corresponding radio access network element updates an NRT and an NCL that are locally stored by the corresponding radio access network element.

Herein, for example, the radio access network element corresponding to each PCI conflicted cell includes the first radio access network element and a second radio access network element. In this case, in S307, the first management network element sends, to the first radio access network element, PCIs of PCI conflicted cells managed by the first radio access network element and ECGIs of the PCI conflicted cells managed by the first radio access network element, and sends, to the second radio access network element, PCIs of PCI conflicted cells managed by the second radio access network element and ECGIs of the PCI conflicted cells managed by the second radio access network element.

For example, the PCI conflicted cells include a cell A, a cell B, a cell C, and a cell D, and the first control network element reassigns PCIs to all the four cells. The first control network element determines, based on ECGIs of the cells, that the cell A and the cell B are cells managed by the radio access network element 1, and determines that the cell C and the cell D are cells managed by the radio access network element 2. Therefore, the first control network element sends the PCIs and ECGIs of the cell A and the cell B to the radio access network element 1, and sends the PCIs and ECGIs of the cell C and the cell D to the radio access network element 2.

Optionally, in an implementation, when sending, to a radio access network element corresponding to each PCI conflicted cell, a corresponding PCI of the PCI conflicted cell and a corresponding ECGI of the PCI conflicted cell, the first control network element may send, to the corresponding radio access network element, a PCI and an ECGI of a cell, whose PCI changes, of the PCI conflicted cells, and do not need to send a PCI and an ECGI of a cell whose PCI does not change.

For example, the PCI conflicted cells include a cell A, a cell B, a cell C, and a cell D, and the first control network element reassigns PCIs to the cell A, the cell B, and the cell C, but does not reassign a PCI to the cell D, that is, the PCI of the cell D remains unchanged. The first control network element determines, based on ECGIs of the cells, that the cell A and the cell B are cells managed by the radio access network element 1, and determines that the cell C and the cell D are cells managed by the radio access network element 2. Therefore, the first control network element sends the PCIs and ECGIs of the cell A and the cell B to the radio access network element 1, and sends the PCI and ECGI of the cell C to the radio access network element 2, but does not send the PCI and ECGI of the cell D to the radio access network element 2.

S308: the first control network element sends, to the first management network element, the PCIs of the PCI conflicted cells managed by the first control network element and the ECGIs of the PCI conflicted cells managed by the first control network element.

Similar to S207, in S308, the PCIs that are of the PCI conflicted cells managed by the first control network element and that are sent by the first control network element to the first radio access network element are PCIs reassigned by the first control network element to the PCI conflicted cells managed by the first control network element.

S309: the first management network element forwards, to the second management network element, the PCIs of the PCI conflicted cells managed by the first control network element and the ECGIs of the PCI conflicted cells managed by the first control network element.

For other descriptions of S308 and S309, refer to descriptions of S208 and S209 in the foregoing embodiments. Details are not described herein again.

In conclusion, in a process of S301 to S308, the first control network element performs PCI optimization when a PCI conflict occurs between a cell managed by the first control network element and a cell managed by the second control network element, and the first control network element determines that a cell, in which the PCI conflict occurs, in one or more cells managed by the second control network element is also a cell managed by the first control network element.

Optionally, as shown in FIG. 9A to FIG. 9D, when a PCI conflict occurs between a cell managed by the first control network element and a cell managed by the second control network element, and the first control network element determines that a cell, in which a PCI conflict occurs, in one or more cells managed by the second control network element is not a cell managed by the first control network element, the PCI conflict detection and optimization method provided in this embodiment of this application may include S401 to S413.

S401: a second management network element sends, to a first management network element, PCI configuration information corresponding to the first management network element.

S402: the first management network element sends, to a first control network element, PCI configuration information corresponding to the first control network element.

S403: the first management network element sends, to a first radio access network element, PCI configuration information corresponding to the first radio access network element.

S404: the first control network element receives a PCI update notification message from a second control network element.

S405: the first control network element detects that a PCI conflict exists in at least two cells.

Similarly, the PCI update notification message includes an NRT corresponding to the second control network element, a PCI of a first cell, an ECGI of the first cell, and a vendor name of the second control network element, the first cell is a cell on which PCI optimization is performed by the second control network element, and the at least two cells include at least one cell managed by the first control network element and at least one cell of the first cell. That the first control network element detects a PCI conflict exists in at least two cells specifically includes: the first control network element determines that a PCI conflict exists in at least one of cells managed by the first control network element and at least one cell of the first cell.

For other descriptions of S401 to S405, refer to related descriptions of S301 to S305 in the foregoing embodiment. Details are not described herein again.

S406: when the at least two cells in which the PCI conflict exists are not cells managed by the first control network element, the first control network element sends a PCI optimization request message to the first management network element.

The optimization request message is used to request the first management network element to perform PCI optimization on PCI conflicted cells, and the PCI optimization request message includes PCIs of the at least two cells, in which the PCI conflict exists, that are detected by the first control network element, ECGIs of the at least two cells, and the vendor name of the second control network element, the at least two cells include at least one of cells managed by the first control network element and at least one cell of the first cell, and the first cell is a cell on which PCI optimization is performed by the second control network element.

In this embodiment of this application, after receiving the PCI optimization request message, the first management network element may learn, based on the PCIs of the at least two cells in which the PCI conflict exists and ECGIs of the at least two cells that are carried in the PCI optimization request message, that the PCI conflict exists in which cells.

Optionally, in another implementation, the PCI optimization request message may include the PCI of the first cell, the ECGI of the first cell, and the vendor name of the second control network element, so that the first management network element determines, with reference to the NRT and the NCL that are corresponding to the first control network element and that are locally stored by the first management network element, and the PCI of the first cell and the ECGI of the first cell that are carried in the PCI optimization request message, that the PCI conflict exists in which cells of the cells managed by the first control network element and the second control network element.

S407: the first management network element receives the PCI optimization request message from the first control network element.

S408: when a vendor name of the first control network element is the same as the vendor name of the second control network element, the first management network element performs PCI optimization on PCI conflicted cells managed by the first management network element.

In this embodiment of this application, when the vendor name of the first control network element is the same as the vendor name of the second control network element, it indicates that the first management network element has permission to perform PCI optimization on PCI conflicted cells that include the at least two cells. Specifically, the first management network element may reassign PCIs to the PCI conflicted cells based on PCI reservation information in the PCI configuration information that is corresponding to the first management network element and that is received by the first management network element from the second management network element.

It should be understood that, after the first management network element completes PCI optimization, the first management network element may also update an NRT and an NCL that are locally stored by the first management network element.

S409: the first management network element sends, to the second management network element, PCIs of the PCI conflicted cells managed by the first management network element and ECGIs of the PCI conflicted cells managed by the first management network element.

Similarly, in S409, the PCIs that are of the PCI conflicted cells managed by the first control network element and that are sent by the first management network element to the second management network element are PCIs reassigned by the first management network element to the PCI conflicted cells managed by the first management network element.

The second management network element may update, based on the PCIs of the PCI conflicted cells managed by the first management network element and the ECGIs of the PCI conflicted cells, an NRT and an NCL that are locally stored by the second management network element. In addition, the second management network element may further update, based on the PCIs that are of the PCI conflicted cells managed by the first management network element and that are received by the second management network element, PCI reservation information locally stored by the second management network element.

In this embodiment of this application, because the first management network element has performed PCI optimization on the PCI conflicted cells based on the PCI reservation information, that is, some PCIs in the PCI reservation information have been assigned to cells in which the PCI conflict occurs, some PCIs in the PCI reservation information are invalid. The second management network element updates the PCI reservation information locally stored by the second management network element, so as to ensure availability of the PCI reservation information, thereby facilitating smooth execution of possible subsequent PCI optimization.

S410: the second management network element sends updated PCI reservation information to the first management network element.

Herein, an example in which a control network element managed by the first management network element includes only the first control network element and the second control network element is used for description. In this case, the updated PCI reservation information includes updated PCI reservation information corresponding to the first control network element and updated PCI reservation information corresponding to the second control network element.

S411: the first management network element sends, to the control network element managed by the first management network element, the updated PCI reservation information corresponding to each control network element, a PCI of a PCI conflicted cell corresponding to the control network element, and an ECGI of the PCI conflicted cell corresponding to the control network element.

It may be understood that after the second management network element completes updating the PCI reservation information, the second management network element may continue to send the updated PCI reservation information to the first management network element. In this way, the first management network element sends updated PCI reservation information corresponding to each control network element to the control network element (that is, the first control network element and the second control network element) managed by the first management network element, so as to ensure availability of the PCI reservation information corresponding to the control network element when the corresponding control network element performs PCI optimization subsequently.

It should be understood that, that the first management network element sends, to the control network element managed by the first management network element, the PCIs of the PCI conflicted cells corresponding to each control network element and the ECGIs of the PCI conflicted cells corresponding to the control network element is used by each control network element to update an NRT and an NCL that are locally stored by the control network element.

S412: the first management network element determines a radio access network element corresponding to each PCI conflicted cell.

The method for determining, by the first management network element, the radio access network element corresponding to each PCI conflicted cell is similar to the method for determining, by the first control network element, the radio access network element corresponding to each PCI conflicted cell in S307. For details, refer to related descriptions in the foregoing embodiment. Details are not described herein again.

S413: the first management network element sends, to the radio access network element corresponding to each PCI conflicted cell, a corresponding PCI of the PCI conflicted cell and a corresponding ECGI of the PCI conflicted cell.

Herein, for example, at least one radio access network element managed by the first control network element is a first radio access network element, and at least one radio access network element managed by the second control network element is a second radio access network element. In this case, in S412, the first management network element sends, to the first radio access network element, PCIs of PCI conflicted cells managed by the first radio access network element and ECGIs of the PCI conflicted cells managed by the first radio access network element, and sends, to the second radio access network element, PCIs of PCI conflicted cells managed by the second radio access network element and ECGIs of the PCI conflicted cells managed by the second radio access network element.

In conclusion, in a process of S401 to S413, the first control network element performs PCI optimization when a PCI conflict occurs between a cell managed by the first control network element and a cell managed by the second control network element, and the first control network element determines that a cell, in which the PCI conflict occurs, in one or more cells managed by the second control network element is not a cell managed by the first control network element, but a vendor name of the first control network element is the same as a vendor name of the second control network element.

Optionally, as shown in FIG. 10A to FIG. 10D, when a PCI conflict occurs between a cell managed by the first control network element and a cell managed by the second control network element, and the first control network element determines that a cell, in which a PCI conflict occurs, in one or more cells managed by the second control network element is not a cell managed by the first control network element, but a vendor name of the first control network element is different from a vendor name of the second control network element, the PCI conflict detection and optimization method provided in this embodiment of this application may include S501 to S515.

S501: a second management network element sends, to a first management network element, PCI configuration information corresponding to the first management network element.

S502: the first management network element sends, to a first control network element, PCI configuration information corresponding to the first control network element.

S503: the first management network element sends, to a first radio access network element, PCI configuration information corresponding to the first radio access network element.

S504: the first control network element receives a PCI update notification message from a second control network element.

S505: the first control network element detects that a PCI conflict exists in at least two cells.

S506: when the at least two cells in which the PCI conflict exists are not cells managed by the first control network element, the first control network element sends a first PCI optimization request message to the first management network element.

The first optimization request message is the PCI optimization request message sent by the first control network element to the first management network element in S406. For detailed descriptions of S501 to S506, refer to related descriptions of S401 to S406 in the foregoing embodiment. Details are not described herein again.

S507: the first management network element receives the first PCI optimization request message from the first control network element.

S508: when a vendor name of the first control network element is different from a vendor name of the second control network element, the first management network element sends a second PCI optimization request message to the second management network element.

The second PCI optimization request message is used to request the second management network element to perform PCI optimization on PCI conflicted cells, and the second PCI optimization request message includes PCIs of the at least two cells, in which the PCI conflict exists, that are detected by the first control network element, ECGIs of the at least two cells, and the vendor name of the second control network element, the at least two cells include at least one of cells managed by the first control network element and at least one cell of the first cell, and the first cell is a cell on which PCI optimization is performed by the second control network element.

S509: the second management network element receives the second PCI optimization request message from the first management network element.

S510: the second management network element performs PCI optimization on PCI conflicted cells managed by the second management network element.

In this embodiment of this application, that the second management network element performs PCI optimization on the PCI conflicted cells managed by the second management network element specifically includes: The second management network element reassigns, based on PCI reservation information stored in the second management network element, PCIs to the PCI conflicted cells managed by the second management network element, where the PCI reservation information includes at least one assignable PCI.

It should be understood that, after the second management network element completes PCI optimization, the second management network element may also update an NRT and an NCL that are locally stored by the second management network element.

S511: the second management network element updates the PCI reservation information stored in the second management network element.

S512: the second management network element sends, to the first management network element, updated PCI reservation information, PCIs of the PCI conflicted cells managed by the second management network element, and ECGIs of the PCI conflicted cells managed by the second management network element.

In S512, the PCIs that are of the PCI conflicted cells managed by the second management network element and that are sent by the second management network element to the first management network element are PCIs reassigned by the second management network element to the PCI conflicted cells managed by the second management network element.

Herein, for example, the second management network element manages only one first management network element. In this case, the updated PCI reservation information in S512 includes updated PCI reservation information corresponding to the first management network element. In addition, because a control network element managed by the first management network element includes only the first control network element and the second control network element, the updated PCI reservation information corresponding to the first management network element (that is, the updated PCI reservation information in S512) includes updated PCI reservation information corresponding to the first control network element and updated PCI reservation information corresponding to the second control network element.

Optionally, the second management network element may separately send, to the first management network element by using independent messages, updated PCI reservation information, the PCIs of the PCI conflicted cells managed by the second management network element, and the ECGIs of the PCI conflicted cells. For example, the second management network element sends the updated PCI reservation information by using a first message, sends, by using a second message, the PCIs of the PCI conflicted cells managed by the second management network element and the ECGIs of the PCI conflicted cells. Alternatively, the second management network element may carry the updated PCI reservation information, the PCIs of the PCI conflicted cells managed by the second management network element, and the ECGIs of the PCI conflicted cells in a same message, and send the message to the first management network element. This is not specifically limited in this embodiment of this application.

S513: the first management network element sends, to the control network element managed by the first management network element, updated PCI reservation information corresponding to each control network element, a PCI of a PCI conflicted cell corresponding to the control network element, and an ECGI of the PCI conflicted cell corresponding to the control network element.

Specifically, the first management network element sends, to the first control network element, updated PCI reservation information corresponding to the first control network element, and sends, to the second control network element, updated PCI reservation information corresponding to the second control network element. For other descriptions of S512, refer to the foregoing related descriptions of S411. Details are not described herein again.

S514: the first management network element determines a radio access network element corresponding to each PCI conflicted cell.

S515: the first management network element sends, to the radio access network element corresponding to each PCI conflicted cell, a corresponding PCI of the PCI conflicted cell and a corresponding ECGI of the PCI conflicted cell.

For detailed descriptions of S514 and S515, refer to related descriptions of S412 and S413 in the foregoing embodiment. Details are not described herein again.

According to the PCI conflict detection and optimization method provided in this embodiment of this application, when a vendor name of the first control network element is different from a vendor name of the second control network element, the second management network element completes PCI conflict optimization by using S501 to S515.

The foregoing mainly describes the solution provided in this embodiment of the present invention from a perspective of interaction between network elements. It may be understood that, to implement the foregoing functions, each network element, for example, the first control network element, the first management network element, or the second management network element, includes a corresponding hardware structure and/or software module for performing the functions. A person skilled in the art should be easily aware that, in the embodiments of the present invention, the units and algorithm steps in the examples described with reference to the embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, function module division may be performed on the first control network element, the first management network element, the second management network element, and the like based on the foregoing method examples, for example, function modules may be divided based on functions, or two or more functions may be integrated into one processing module. The integrated module may be implemented in a form of hardware, or may be implemented in a form of a software function module. It should be noted that, in the embodiments of the present invention, module division is an example and is merely a logical function division. In actual implementation, another division manner may be used.

Figure 11:
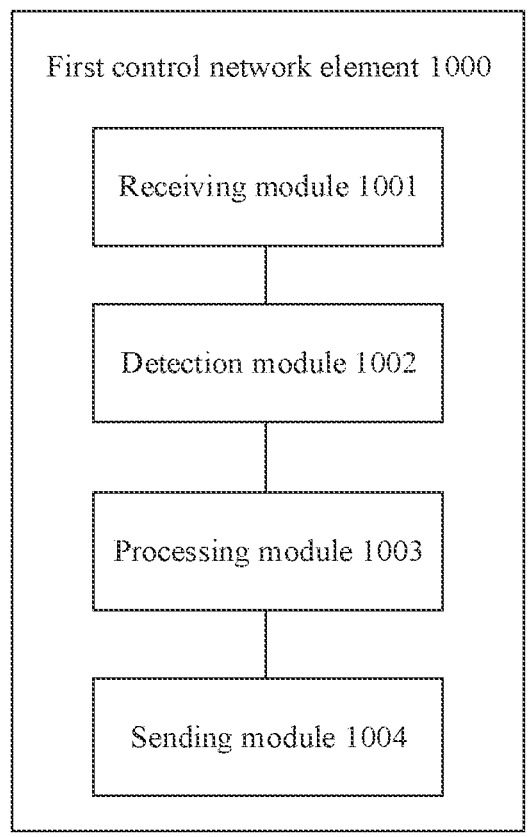
FIG. 11 is a schematic structural diagram 1 of a first control network element according to an embodiment of this application.

When function modules are obtained through division based on corresponding functions, FIG. 11 is a possible schematic structural diagram of the first control network element in the foregoing embodiment. As shown in FIG. 11, a first control network element 1000 may include: a receiving module 1001, a detection module 1002, a processing module 1003, and a sending module 1004. The receiving module 1001 may be configured to support the first control network element 1000 in performing S101, S106, S204, S304, S404, S504, and S506 in the foregoing method embodiments. The detection module 1002 may be configured to support the first control network element 1000 in performing S102 (including S1021 or S1022), S205, S305, S405, and S505 in the foregoing method embodiments. The processing module 1003 may be configured to support the first control network element 1000 in performing S103, S104 (including S1041), S206, and S306 in the foregoing method embodiments. The sending module 1004 may be configured to support the first control network element 1000 in performing S105, S207, S208, S307, S308, and S406 in the foregoing method embodiments. All related content of the steps in the foregoing method embodiments may be cited in function descriptions of corresponding function modules. Details are not described herein again.

Figure 12:
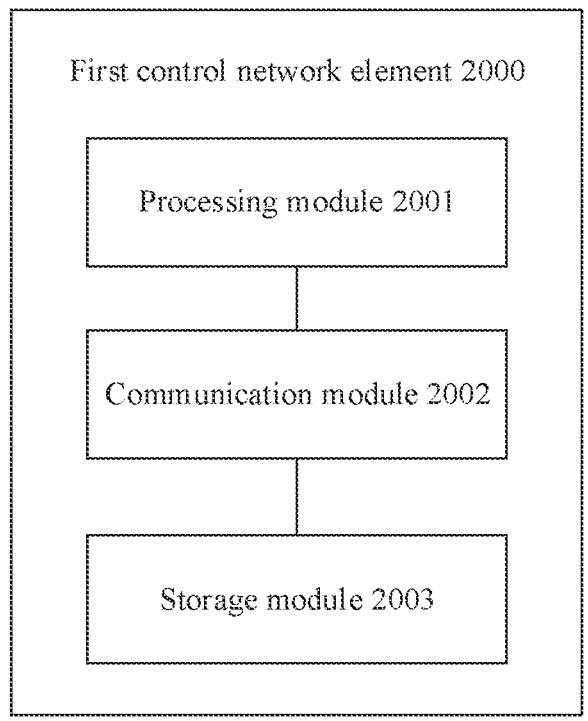
FIG. 12 is a schematic structural diagram 2 of a first control network element according to an embodiment of this application.

When an integrated unit is used, FIG. 12 is a possible schematic structural diagram of the first control network element in the foregoing embodiment. As shown in FIG. 12, a first control network element 2000 may include a processing module 2001 and a communication module 2002. The processing module 2001 may be configured to control and manage an action of the first control network element 2000. For example, the processing module 2001 may be configured to support the first control network element 2000 in performing S102 (including S1021 or S1022), S103, S104 (including S1041), S205, S206, S305, S306, S405, and S505 in the foregoing method embodiment, and/or another process used in the technology described in this specification. The communication module 2002 may be configured to support the first control network element 2000 in communicating with another network entity. For example, the communication module 2002 may be configured to support the first control network element 2000 in performing S101, S105, S106, S204, S207, S208, S304, S307, S308 S404, S406, S504, and S506 in the foregoing method embodiments. Optionally, as shown in FIG. 12, the first control network element 2000 may further include a storage module 2003, configured to store program code and data of the first control network element 2000.

The processing module 2001 may be a processor or a controller, for example, may be a central processing unit (CPU), a general-purpose processor, a digital signal processor (DSP), an application-specific integrated circuit (ASIC), a field programmable gate array (FPGA), or another programmable logic component, a transistor logic component, a hardware component, or a combination thereof. The processing module 2001 may implement or execute various example logical blocks, modules, and circuits described with reference to content disclosed in the embodiments of the present invention. Alternatively, the processor may be a combination of processors implementing a computation function, for example, a combination that includes one or more microprocessors, or a combination of a DSP and a microprocessor. The communication module 2002 may be a transceiver, a transceiver circuit, a communication interface, or the like. The storage module 2003 may be a memory.

When the processing module 2001 is the processor, the communication module 2002 is the transceiver, and the storage module 2003 is the memory, the processor, the transceiver, and the memory may be connected through a bus. The bus may be a peripheral component interconnect (PCI) bus, an extended industry standard architecture (EISA) bus, or the like. The bus may be classified into an address bus, a data bus, a control bus, and the like.

Figure 13:
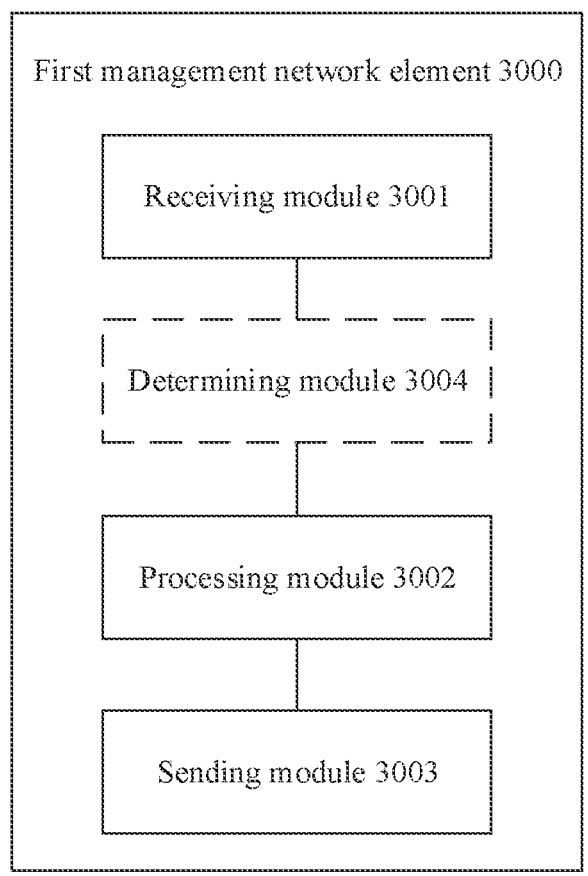
FIG. 13 is a schematic structural diagram 1 of a first management network element according to an embodiment of this application.

When function modules are obtained through division based on corresponding functions, FIG. 13 is a possible schematic structural diagram of the first management network element in the foregoing embodiment. As shown in FIG. 13, a first management network element 3000 may include: a receiving module 3001, a processing module 3002, and a sending module 3003. The receiving module 3001 may be configured to support the first management network element 3000 in performing S407 and S507 in the foregoing method embodiments. The processing module 3002 may be configured to support the first management network element 3000 in performing S408 in the foregoing method embodiment. The sending module 3003 may be configured to support the first management network element 3000 in performing S202, S203, S209, S302, S303, S309, S402, S403, S409, S411, S413, S502, S503, S508, S503, and S515 in the foregoing method embodiments.

Optionally, as shown in FIG. 13, the first management network element 3000 may further include a determining module 3004, and the determining module 3004 may be configured to support the first management network element 3000 in performing S412 and S514 in the foregoing method embodiments. All related content of the steps in the foregoing method embodiments may be cited in function descriptions of corresponding function modules. Details are not described herein again.

Figure 14:
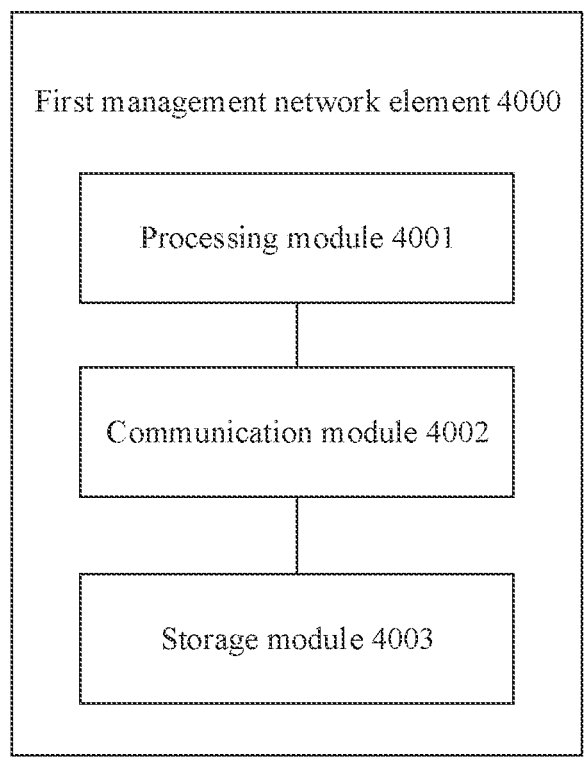
FIG. 14 is a schematic structural diagram 2 of a first management network element according to an embodiment of this application.

When an integrated unit is used, FIG. 14 is a possible schematic structural diagram of the first management network element in the foregoing embodiment. As shown in FIG. 14, a first management network element 4000 may include a processing module 4001 and a communication module 4002. The processing module 4001 may be configured to control and manage an action of the first management network element 4000. For example, the processing module 4001 may be configured to support the first management network element 4000 in performing S412, S407, S514, and S507 in the foregoing method embodiments. The communication module 4002 may be configured to support the first management network element 4000 in communicating with another network entity. For example, the communication module 4002 may be configured to support the first management network element 4000 in performing S202, S203, S209, S302, S303, S309, S402, S403, S407, S409, S411, S413, S502, S503, S508, S503, S515, and S507 in the foregoing method embodiments. Optionally, as shown in FIG. 14, the first management network element 4000 may further include a storage module 4003, configured to store program code and data of the first management network element 4000.

The processing module 4001 may be a processor or a controller, for example, may be a CPU, a general-purpose processor, a DSP, an ASIC, an FPGA, or another programmable logic device, a transistor logic device, a hardware component, or any combination thereof. The processing module 4001 may implement or execute various example logical blocks, modules, and circuits described with reference to content disclosed in the embodiments of the present invention. Alternatively, the processor may be a combination of processors implementing a computation function, for example, a combination that includes one or more microprocessors, or a combination of a DSP and a microprocessor. The communication module 4002 may be a transceiver, a transceiver circuit, a communication interface, or the like. The storage module 4003 may be a memory.

When the processing module 4001 is the processor, the communication module 4002 is the transceiver, and the storage module 4003 is the memory, the processor, the transceiver, and the memory may be connected through a bus. The bus may be a PCI bus, an EISA bus, or the like. The bus may be classified into an address bus, a data bus, a control bus, and the like.

Figure 15:
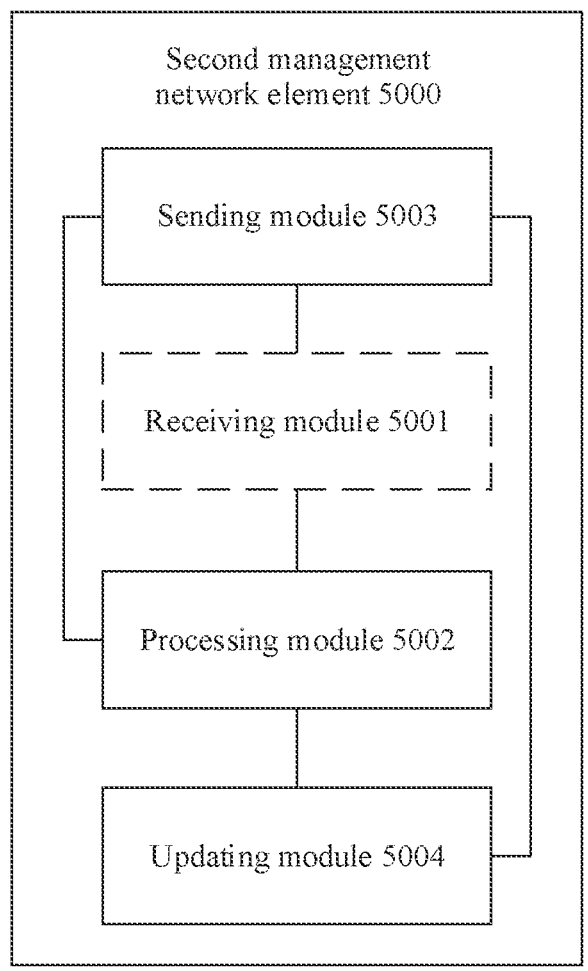
FIG. 15 is a schematic structural diagram 1 of a second management network element according to an embodiment of this application.

When function modules are obtained through division based on corresponding functions, FIG. 15 is a possible schematic structural diagram of the second management network element in the foregoing embodiment. As shown in FIG. 15, a second management network element 5000 may include: a receiving module 5001 and a processing module 5002. The receiving module 5001 may be configured to support the second management network element 5000 in performing S509 in the foregoing method embodiment. The processing module 5002 may be configured to support the second management network element 5000 in performing S510 in the foregoing method embodiment.

Optionally, as shown in FIG. 15, the second management network element 5000 may further include a sending module 5003 and an updating module 5004. The sending module 5003 may be configured to support the second management network element 5000 in performing S201, S301, S401, S410, S501, and S512 in the foregoing method embodiments. The updating module 5004 may be configured to support the second management network element 5000 in performing S511 in the foregoing method embodiment. All related content of the steps in the foregoing method embodiments may be cited in function descriptions of corresponding function modules. Details are not described herein again.

Figure 16:
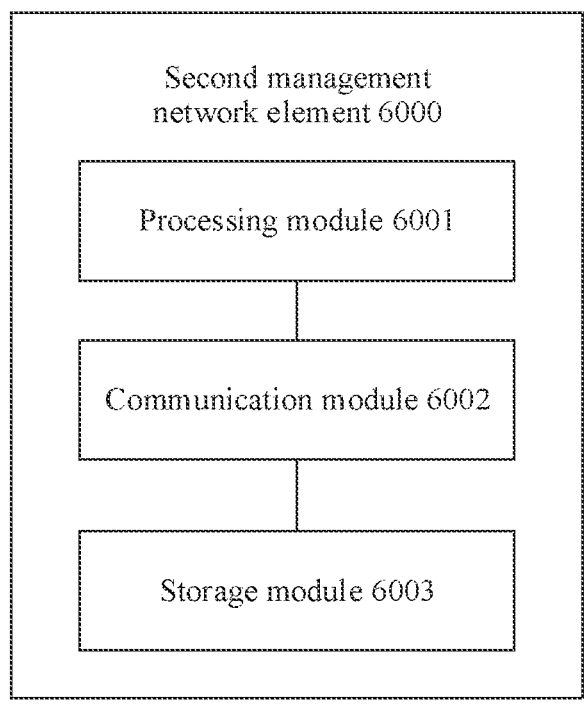
FIG. 16 is a schematic structural diagram 2 of a second management network element according to an embodiment of this application.

When an integrated unit is used, FIG. 16 is a possible schematic structural diagram of the second management network element in the foregoing embodiment. As shown in FIG. 16, a second management network element 6000 may include a processing module 6001 and a communication module 6002. The processing module 6001 may be configured to control and manage an action of the second management network element 6000. For example, the processing module 6001 may be configured to support the second management network element 6000 in performing S510 and S511 in the foregoing method embodiments. The communication module 6002 may be configured to support the second management network element 6000 in communicating with another network entity. For example, the communication module 6002 may be configured to support the second management network element 6000 in performing S201, S301, S401, S410, S501, S512, and S509 in the foregoing method embodiments. Optionally, as shown in FIG. 16, the second management network element 6000 may further include a storage module 6003, configured to store program code and data of the second management network element 6000.

The processing module 6001 may be a processor or a controller, for example, may be a CPU, a general-purpose processor, a DSP, an ASIC, an FPGA, or another programmable logic device, a transistor logic device, a hardware component, or any combination thereof. The processing module 6001 may implement or execute various example logical blocks, modules, and circuits described with reference to content disclosed in the embodiments of the present invention. Alternatively, the processor may be a combination of processors implementing a computation function, for example, a combination that includes one or more microprocessors, or a combination of a DSP and a microprocessor. The communication module 6002 may be a transceiver, a transceiver circuit, a communication interface, or the like. The storage module 6003 may be a memory.

When the processing module 6001 is the processor, the communication module 6002 is the transceiver, and the storage module 6003 is the memory, the processor, the transceiver, and the memory may be connected through a bus. The bus may be a PCI bus, an EISA bus, or the like. The bus may be classified into an address bus, a data bus, a control bus, and the like.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
receiving, by a first control network element, a physical cell identifier (PCI) conflict detection notification message for triggering the first control network element to perform PCI conflict detection, wherein the PCI conflict detection notification message is a neighbor relation notification message received by the first control network element from a first radio access network element, the neighbor relation notification message comprises a neighbor relation table (NRT) and a neighbor cell list (NCL) corresponding to the first radio access network element;
determining, by the first control network element, that a PCI conflict exists in at least two cells;
determining whether the at least two cells are managed by the first control network element;
in response to determining that the at least two cells are cells managed by the first control network element, performing, by the first control network element, PCI optimization on PCI conflicted cells managed by the first control network element, wherein the PCI conflicted cells comprise the at least two cells; and
in response to determining that at least one of the at least two cells is not a cell managed by the first control network element, sending, by the first control network element, a PCI optimization request message to a first management network element, wherein the PCI optimization request message requests the first management network element to perform PCI optimization.

2. The method according to claim 1, wherein the method further comprises:
receiving, by the first control network element, PCI reservation information from the first management network element, wherein the PCI reservation information comprises at least one assignable PCI; and
wherein performing the PCI optimization on the PCI conflicted cells comprises:
reassigning, by the first control network element based on the PCI reservation information, PCIs to the PCI conflicted cells managed by the first control network element.

3. The method according to claim 1,
wherein determining that the PCI conflict exists in at least two cells comprises:
determining, by the first control network element based on the NRT and the NCL that are corresponding to the first radio access network element and an NRT and an NCL that are corresponding to another radio access network element, that the PCI conflict exists in the at least two cells.

4. The method according to claim 1, wherein the method further comprises:
after performing the PCI optimization on the PCI conflicted cells, sending, by the first control network element, a PCI update notification message to a second control network element, wherein the PCI update notification message comprises the NRT corresponding to the first control network element, PCIs of the PCI conflicted cells managed by the first control network element, evolved universal terrestrial radio access network cell global identifiers (ECGIs) of the PCI conflicted cells, and a vendor name of the first control network element, and wherein the first control network element is adjacent to the second control network element.

5. The method according to claim 1, wherein the PCI conflict detection notification message is a PCI update notification message received by the first control network element from a second control network element, wherein the PCI update notification message comprises the NRT corresponding to the second control network element, a PCI of a first cell, an evolved universal terrestrial radio access network cell global identifier (ECGI) of the first cell, and a vendor name of the second control network element, wherein the first cell is a cell on which PCI optimization is performed by the second control network element, and wherein the at least two cells comprise at least one cell managed by the first control network element and the first cell.

6. The method according to claim 5, wherein the PCI optimization request message comprises PCIs of the at least two cells, ECGIs of the at least two cells, and the vendor name of the second control network element.

7. The method according to claim 1, wherein the method further comprises:
after performing the PCI optimization on the PCI conflicted cells, sending, by the first control network element to a radio access network element corresponding to each of the PCI conflicted cells, a corresponding PCI of a PCI conflicted cell and a corresponding evolved universal terrestrial radio access network cell global identifier (ECGI) of a PCI conflicted cell; and
sending, by the first control network element to the first management network element, PCIs of the PCI conflicted cells managed by the first control network element and ECGIs of the PCI conflicted cells.

8. A control network element comprising:
at least one processor;
one or more memories coupled to the at least one processor and storing programming instructions for execution by the at least one processor to perform operations comprising:
receiving a physical cell identifier (PCI) conflict detection notification message for triggering the control network element to perform PCI conflict detection, wherein the PCI conflict detection notification message is a neighbor relation notification message received by the control network element from a first radio access network element, the neighbor relation notification message comprises a neighbor relation table (NRT) and a neighbor cell list (NCL) corresponding to the first radio access network element;
determining that a PCI conflict exists in at least two cells;
determining whether the at least two cells are managed by the control network element;
in response to determining that the at least two cells are cells managed by the control network element, performing PCI optimization on PCI conflicted cells managed by the control network element, wherein the PCI conflicted cells comprise the at least two cells; and in response to determining that at least one of the at least two cells is not a cell managed by the control network element, sending a PCI optimization request message to a first management network element, wherein the PCI optimization request message requests the first management network element to perform PCI optimization.

9. The control network element according to claim 8, wherein the operations further comprises:
receiving PCI reservation information from the first management network element, wherein the PCI reservation information comprises at least one assignable PCI; and
wherein performing the PCI optimization on the PCI conflicted cells comprises:
reassigning, based on the PCI reservation information, PCIs to the PCI conflicted cells managed by the control network element.

10. The control network element according to claim 8, wherein determining that the PCI conflict exists in at least two cells comprises:
determining, based on the NRT and the NCL that are corresponding to the first radio access network element and an NRT and an NCL that are corresponding to another radio access network element, that the PCI conflict exists in the at least two cells.

11. The control network element according to claim 8, wherein the operations further comprises:
after performing the PCI optimization on the PCI conflicted cells, sending a PCI update notification message to another control network element, wherein the PCI update notification message comprises the NRT corresponding to the control network element, PCIs of the PCI conflicted cells managed by the control network element, evolved universal terrestrial radio access network cell global identifiers (ECGIs) of the PCI conflicted cells, and a vendor name of the control network element, and wherein the control network element is adjacent to the another control network element.

12. The control network element according to claim 8, wherein the PCI conflict detection notification message is a PCI update notification message received by the control network element from another control network element, wherein the PCI update notification message comprises the NRT corresponding to the another control network element, a PCI of a first cell, an evolved universal terrestrial radio access network cell global identifier (ECGI) of the first cell, and a vendor name of the another control network element, wherein the first cell is a cell on which PCI optimization is performed by the another control network element, and wherein the at least two cells comprise at least one cell managed by the control network element and the first cell.

13. The control network element according to claim 12, wherein the PCI optimization request message comprises PCIs of the at least two cells, ECGIs of the at least two cells, and the vendor name of the another control network element.

14. The control network element according to claim 8, wherein the operations further comprises:
after performing the PCI optimization on the PCI conflicted cells, sending, to a radio access network element corresponding to each of the PCI conflicted cells, a corresponding PCI of a PCI conflicted cell and a corresponding evolved universal terrestrial radio access network cell global identifier (ECGI) of a PCI conflicted cell; and
sending to the first management network element, PCIs of the PCI conflicted cells managed by the control network element and ECGIs of the PCI conflicted cells.

15. A non-transitory, computer-readable medium storing one or more instructions executable by at least one processor to perform operations comprising:
receiving, by a first control network element, a physical cell identifier (PCI) conflict detection notification message for triggering the first control network element to perform PCI conflict detection, wherein the PCI conflict detection notification message is a neighbor relation notification message received by the control network element from a first radio access network element, the neighbor relation notification message comprises a neighbor relation table (NRT) and a neighbor cell list (NCL) corresponding to the first radio access network element;
determining, by the first control network element, that a PCI conflict exists in at least two cells;
determining whether the at least two cells are managed by the first control network element;
in response to determining that the at least two cells are cells managed by the first control network element, performing, by the first control network element, PCI optimization on PCI conflicted cells managed by the first control network element, wherein the PCI conflicted cells comprise the at least two cells; and
in response to determining that at least one of the at least two cells is not a cell managed by the first control network element, sending, by the first control network element, a PCI optimization request message to a first management network element, wherein the PCI optimization request message requests the first management network element to perform PCI optimization.

16. The non-transitory, computer-readable medium according to claim 15, wherein the operations further comprises:
receiving, by the first control network element, PCI reservation information from the first management network element, wherein the PCI reservation information comprises at least one assignable PCI; and
wherein performing the PCI optimization on the PCI conflicted cells comprises:
reassigning, by the first control network element based on the PCI reservation information, PCIs to the PCI conflicted cells managed by the first control network element.

17. The non-transitory, computer-readable medium according to claim 15,
wherein determining that the PCI conflict exists in at least two cells comprises:
determining, by the first control network element based on the NRT and the NCL that are corresponding to the first radio access network element and an NRT and an NCL that are corresponding to another radio access network element, that the PCI conflict exists in the at least two cells.

18. The non-transitory, computer-readable medium according to claim 15, wherein the operations further comprises:
after performing the PCI optimization on the PCI conflicted cells, sending, by the first control network element, a PCI update notification message to a second control network element, wherein the PCI update notification message comprises the NRT corresponding to the first control network element, PCIs of the PCI conflicted cells managed by the first control network element, evolved universal terrestrial radio access network cell global identifiers evolved universal terrestrial radio access network cell global identifiers (ECGIs) of the PCI conflicted cells, and a vendor name of the first control network element, and wherein the first control network element is adjacent to the second control network element.

19. The non-transitory, computer-readable medium according to claim 15, wherein the PCI conflict detection notification message is a PCI update notification message received by the first control network element from a second control network element, wherein the PCI update notification message comprises the NRT corresponding to the second control network element, a PCI of a first cell, an evolved universal terrestrial radio access network cell global identifier (ECGI) of the first cell, and a vendor name of the second control network element, wherein the first cell is a cell on which PCI optimization is performed by the second control network element, and wherein the at least two cells comprise at least one cell managed by the first control network element and the first cell.

20. The non-transitory, computer-readable medium according to claim 19, wherein the PCI optimization request message comprises PCIs of the at least two cells, ECGIs of the at least two cells, and the vendor name of the second control network element.

\* \* \* \* \*